(12) United States Patent
Hughes et al.

(10) Patent No.: US 11,402,811 B2
(45) Date of Patent: Aug. 2, 2022

(54) CROSS-SENSOR PREDICTIVE INFERENCE

(71) Applicant: DSi Digital, LLC, Peachtree Corners, GA (US)

(72) Inventors: Anthony Mitchell Hughes, Alpharetta, GA (US); Prince Pal Birring, Norcross, GA (US)

(73) Assignee: DSi Digital, LLC, Peachtree Corners, GA (US)

( * ) Notice: Subject to any disclaimer, the term of this patent is extended or adjusted under 35 U.S.C. 154(b) by 406 days.

(21) Appl. No.: 16/699,838

(22) Filed: Dec. 2, 2019

(65) Prior Publication Data

US 2020/0174433 A1 Jun. 4, 2020

Related U.S. Application Data

(60) Provisional application No. 62/774,569, filed on Dec. 3, 2018, provisional application No. 62/774,602, filed (Continued)

(51) Int. Cl.
*G05B 13/04* (2006.01)
*G06N 5/04* (2006.01)
(Continued)

(52) U.S. Cl.
CPC ......... *G05B 13/048* (2013.01); *G06F 16/212* (2019.01); *G06F 16/248* (2019.01);
(Continued)

(58) Field of Classification Search
CPC ............... G05B 13/048; G05B 19/048; G05B 23/0254; G05B 13/0285; G05B 19/4063;
(Continued)

(56) References Cited

U.S. PATENT DOCUMENTS 6,405,364 B1 6/2002 Bowan-Amuah
6,584,184 B1 6/2003 Nabkel et al.
(Continued)

FOREIGN PATENT DOCUMENTS

CN 108229440 A 6/2018

OTHER PUBLICATIONS

International Searching Authority, International Search Report and Written Opinion for International Application No. PCT/US2019/064000, dated Jan. 29, 2020, (14 pages), European Patent Office, Rijswijk, The Netherlands.

(Continued)

*Primary Examiner* — Nimesh Patel
(74) *Attorney, Agent, or Firm* — Alston & Bird LLP

(57) ABSTRACT

There is a need for solutions for efficiently and reliably perform sensor-based predictive data analysis. This need can be addressed by, for example, solutions for performing cross-sensor predictive data analysis. In one example, a method for performing cross-sensor predictive data analysis includes identifying sensor input data objects comprising one or more image data objects; determining sensor feature data objects based on the sensor input data objects; generating predictions for a target predictive entity associated with the sensor input data objects by processing the sensor feature data objects using a cross-sensor predictive inference model; and performing prediction-based actions based on the cross-sensor predictions.

20 Claims, 27 Drawing Sheets

Related U.S. Application Data on Dec. 3, 2018, provisional application No. 62/774,573, filed on Dec. 3, 2018, provisional application No. 62/774,579, filed on Dec. 3, 2018.

(51) Int. Cl.
| | |
|---|---|
| *G06N 7/00* | (2006.01) |
| *G06N 3/02* | (2006.01) |
| *G06F 21/60* | (2013.01) |
| *G06F 21/62* | (2013.01) |
| *H04L 9/40* | (2022.01) |
| *G06F 16/28* | (2019.01) |
| *G06N 20/00* | (2019.01) |
| *G06F 16/26* | (2019.01) |
| *G06F 16/248* | (2019.01) |
| *G06F 16/2457* | (2019.01) |
| *G06F 16/2458* | (2019.01) |
| *G06F 16/21* | (2019.01) |
| *G06V 30/194* | (2022.01) |
| *G06F 3/0482* | (2013.01) |
| *G06F 3/0484* | (2022.01) |

(52) U.S. Cl.
CPC .... *G06F 16/2458* (2019.01); *G06F 16/24573* (2019.01); *G06F 16/24578* (2019.01); *G06F 16/26* (2019.01); *G06F 16/282* (2019.01); *G06F 16/287* (2019.01); *G06F 16/288* (2019.01); *G06F 16/289* (2019.01); *G06F 21/604* (2013.01); *G06F 21/6209* (2013.01); *G06N 3/02* (2013.01); *G06N 5/04* (2013.01); *G06N 7/005* (2013.01); *G06N 20/00* (2019.01); *G06V 30/194* (2022.01); *H04L 63/105* (2013.01); *G06F 3/0482* (2013.01); *G06F 3/0484* (2013.01)

(58) Field of Classification Search
CPC ........ G05B 19/425; G05B 2219/36417; G05B 2219/37572; G05B 23/02; G05B 23/0221; G05B 23/024; G06F 16/212; G06F 16/24573; G06F 16/24578; G06F 16/2458; G06F 16/248; G06F 16/26; G06F 16/282; G06F 16/287; G06F 16/288; G06F 16/289; G06F 21/604; G06F 21/6209; G06F 3/0482; G06F 3/0484; G06F 2221/2111; G06F 21/62; G06F 16/284; G06F 21/32; G06F 9/5027; G06F 16/683; G06F 3/011; G06F 11/2263; G06F 2221/2133; G06F 3/017; G06F 3/14; G06F 30/20; G06F 16/00; G06F 16/29; G06F 16/90; G06F 16/93; G06F 17/18; G06F 21/35; G06F 2111/16; G06F 16/50; G06F 21/36; G06F 3/015; G06F 3/016; G06F 3/0416; G06F 30/12; G06F 30/13; G06F 30/27; G06F 3/005; G06F 3/01; G06F 3/014; G06F 3/013; G06F 11/00; G06F 11/2257; G06F 11/30; G06N 3/02; G06N 5/04; G06N 7/005; G06N 20/00; G06N 5/022; G06N 3/0454; G06N 20/20; G06N 3/006; G06N 3/008; G06N 3/0445; G06N 3/088; G06N 3/126; G06N 5/046; G06N 3/04; G06N 3/0427; G06N 3/0436; G06N 3/08; G06N 3/063; G06N 3/049; G06N 3/086; G06N 20/10; G06N 5/045; G06N 5/048; G06V 30/194; G06V 40/172; G06V 10/993; G06V 40/1347; G06V 40/161; G06V 40/168; G06V 10/56; G06V 40/1365; G06V 40/18; G06V 40/193; G06V 40/1335; G06V 40/197; G06V 20/80; G06V 40/10; G06V 40/20; G06V 10/82; G06V 10/96; G06V 20/64; G06V 40/1388; G06V 40/12; G06V 40/16; G06V 40/171; G06V 40/19; G06V 40/45; G06V 10/10; G06V 10/255; G06V 10/267; G06V 20/20; G06V 20/46; G06V 20/52; G06V 20/58; G06V 20/698; G06V 20/95; G06V 30/416; G06V 30/414; G06V 40/113; G06V 40/117; G06V 40/40; G06V 40/50; G06V 40/70; G06V 10/147; G06V 10/20; G06V 10/22; G06V 10/26; G06V 10/40; G06V 10/50; H04L 63/105; G06T 11/206; G06T 7/00; G06T 2207/10016; G06T 2200/24; G06T 7/0006; G06T 7/20; G06T 1/00; G06T 2200/04; G06T 13/80; G06T 2207/10028; G06T 7/60; G06T 2207/10044; G06T 2207/10048; G06T 2207/20036; G06T 2207/20081; G06T 2207/20084; G06T 2207/20221; G06T 2207/30201; G06T 3/4038; G06T 5/002; G06T 7/0008; G06T 7/11; G06T 7/174; G06T 7/70; G06T 7/74; G06T 7/73; G06T 1/0007; G06T 2207/10141; G06T 7/0012; G06T 7/136; G06T 7/246; G06Q 10/04; G06Q 10/06; G06K 9/00; G06K 9/6253; G06K 9/00536; G06K 9/62; G06K 9/6267; G06K 7/1404; G06K 9/00523; G06K 9/6215; G06K 9/6218; G06K 9/626; G06K 9/6262; G06K 9/6269; G06K 9/6274; G16H 50/20; G16H 10/60; G16H 40/67; G16H 30/20; G16H 50/50

See application file for complete search history.

(56) References Cited

U.S. PATENT DOCUMENTS

| | | | |
|---|---|---|---|
| 7,389,208 B1 | 6/2008 | Solinsky | |
| 10,739,955 B2 | 8/2020 | Wang et al. | |
| 2001/0048217 A1* | 12/2001 | Seip | G01S 15/04 |
| | | | 280/730.2 |
| 2002/0083072 A1 | 6/2002 | Steuart | |
| 2003/0154381 A1 | 8/2003 | Ouye et al. | |
| 2005/0060048 A1 | 3/2005 | Pierre et al. | |
| 2008/0148340 A1 | 6/2008 | Powell et al. | |
| 2009/0292755 A1* | 11/2009 | Waagen | G06K 9/6252 |
| | | | 708/520 |
| 2011/0167479 A1* | 7/2011 | Maes | H04L 9/3213 |
| | | | 726/4 |
| 2014/0250534 A1 | 9/2014 | Flores | |
| 2014/0297268 A1 | 10/2014 | Govrin | |
| 2014/0379615 A1 | 12/2014 | Brigham et al. | |
| 2014/0380285 A1 | 12/2014 | Gabel et al. | |
| 2015/0347746 A1 | 12/2015 | Martel et al. | |
| 2016/0026253 A1 | 1/2016 | Bradski et al. | |
| 2016/0092691 A1 | 3/2016 | Thom et al. | |
| 2016/0182529 A1 | 6/2016 | Biehl et al. | |
| 2016/0224664 A1 | 8/2016 | Noren et al. | |
| 2016/0248809 A1 | 8/2016 | Smith et al. | |
| 2016/0378919 A1* | 12/2016 | McNutt | G16H 40/63 |
| | | | 705/3 |
| 2017/0032017 A1 | 2/2017 | Morinaga et al. | |
| 2017/0220582 A1 | 8/2017 | McCann et al. | |
| 2017/0323028 A1 | 11/2017 | Jonker et al. | |
| 2017/0351241 A1* | 12/2017 | Bowers | G06N 5/022 |
| 2017/0364534 A1* | 12/2017 | Zhang | G06F 16/284 |
| 2018/0046714 A1 | 2/2018 | Blaas | |
| 2019/0058682 A1 | 2/2019 | MacAskill et al. | |

(56) References Cited

U.S. PATENT DOCUMENTS

| | | |
|---|---|---|
| 2019/0073406 A1 | 3/2019 | Xu et al. |
| 2019/0121350 A1 | 4/2019 | Celia et al. |
| 2019/0129732 A1 | 5/2019 | Sivertson |
| 2019/0158498 A1 | 5/2019 | Brouillette et al. |
| 2019/0213282 A1 | 7/2019 | Perumal et al. |

OTHER PUBLICATIONS

International Searching Authority, International Search Report and Written Opinion for International Application No. PCT/US2019/064007, dated Jan. 29, 2020, (14 pages), European Patent Office, Rijswijk, The Netherlands.

International Searching Authority, International Search Report and Written Opinion for International Application No. PCT/US2019/064009, dated Jan. 29, 2020, (15 pages), European Patent Office, Rijswijk, The Netherlands.

Kaur, Karamjit et al. *Modeling and Querying Data in NoSQL Databases*, 2013 IEEE International Conference on Big Data, Oct. 6, 2013, pp. 1-7, IEEE. XP032535034. DOI: 10.1109/BIGDATA.2013.6691765.

NonFinal Office Action for U.S. Appl. No. 16/699,881, dated Feb. 5, 2021, (27 pages), United States Patent and Trademark Office, USA.

International Searching Authority, International Search Report and Written Opinion for International Application No. PCT/US2019/064019, dated Feb. 4, 2020, (16 pages), European Patent Office, Rijswijk, The Netherlands.

International Searching Authority, International Search Report and Written Opinion for International Application No. PCT/US2019/064014, dated Feb. 24, 2020, (15 pages), European Patent Office, Rijswijk, The Netherlands.

Liu, Jie et al. *An Integrated Multi-Sensor Fusion-Based Deep Feature Learning Approach for Rotating Machinery Diagnosis*, Measurement Science and Technology, IOP Publishing, vol. 29, No. 5:055103, Mar. 23, 2018, pp. 1-12. XP020326551, ISSN: 0957-0233, DOI: 10.1088/1361-6501/AAACA6.

Roemer, Michael J. et al. *Assessment of Data and Knowledge Fusion Strategies for Prognostics and Health Management,*. In 2001 IEEE Aerospace Conference Proceedings (Cat. No. 01TH8542), vol. 6, Mar. 10-17, 2001, pp. 2979-2988. XP010548420, ISBN: 978-0-7803-6599-5.

Van Cleeff, André et al. *Benefits of Location-Based Access Control: A Literature Study*, 2010 IEEE/ACM International Conference on Green Computing and Communications & 2010 IEEE/ACM Intenrational Conference on Cyber, Physical and Social Computing, Dec. 18, 2010, pp. 739-746. XP031923565. ISBN: 978-1-4244-9779-9, DOI: 10.1109/GREENCOM-CPSCOM.2010.148.

Mees, Oier et al. *Choosing Smartly: Adaptive Multimodal Fusion for Object Detection in Changing Environments*, Cornell University Library, arXiv: 1707:05733v2 [cs.RO], Nov. 19, 2019, (6 pages). XP081560832, DOI: 10.1109/IROS.2016.7759048.

Ge, Chenjie et al. *Deep Learning and Multi-Sensor Fusion for Glioma Classification Using Multistream 2D Convolutional Networks, 2018 40th* Annual Intenrational Conference of the IEEE Engineering in Medicine and Biology Socity (EMBC), Jul. 18, 2018, pp. 5894-5897. XP033429601, DOI: 10.1109/EMBC.2018.8513556.

Vielzeuf, Valentin et al. *Multi-Level Sensor Fusion With Deep Learning*, arXiv: 1811.02447v1 [cs.CV], Nov. 7, 2018, pp. 1-12. XP055661381, DOI: 10.1109/LSENS.2018/2878908.

Notice of Allowance and Fee(s) Due for U.S. Appl. No. 16/699,874, dated Jun. 16, 2021, (21 pages), United States Patent and Trademark Office, USA.

NonFinal Office Action for U.S. Appl. No. 16/699,892, dated Jun. 17, 2021, (13 pages), United States Patent and Trademark Office, USA.

NonFinal Office Action for U.S. Appl. No. 16/699,853, dated Sep. 1, 2021, (26 pages), United States Patent and Trademark Office, USA.

Huth, Alexander G. et al. *A Continuous Semantic Space Describes the Representation of Thousands of Object and Action Categories Across the Human Brain*, Neuron, vol. 76, Issue 6, pp. 1210-1224, Dec. 20, 2012. DOI: https://doi.org/10.1016/j.neuron.2012.10.014.

Thaler, S.L. *Autonomous Ultrahard Materials Discovery via Spreadsheet-Implemented Neural Network Cascades*, (11 pages), [article, online], [retrieved from the Internet Dec. 31, 2019] <https://www.tms.org/pubs/journals/JOM/9704/Thaler/Thaler-9704.html>.

*Building Information Modeling*, Wikipedia, (19 pages), [online ], [retrieved from the Internet Dec. 31, 2019] <https://en.wikipedia.org/wiki/Building_information_modeling>.

*DARPA Perspective on Artificial Intelligence*, Defense Advanced Research Projects Agency, (2 pages), [article, online], [retrieved from the Internet Dec. 31, 2019] <https://www.darpa.mil/about-us/darpa-perspective-on-ai>.

Kanner, Josh et al. *Get Ready for Artificial Intelligence in Contruction*, Autodesk University, (5 pages), [article, online], [retrieved from the Internet Dec. 31, 2019] <https://www.autodesk.com/autodesk-university/class/Get-Ready-Artificial-Intelligence-Construction-2017#chapter>.

Huth, Alexander G. *Natural Speech Reveals the Semantic Maps That Tile Human Cerebral Cortex*, Nature, vol. 532, pp. 453-458, Apr. 28, 2016. DOI: 10.1038/nature17637.

Mac Carron, Pádraig et al. *Calling Dunbar's Numbers*, Elsevier Social Networks, vol. 47, pp. 151-155 (2016). DOI:10.1016/j.socnet.2016.06.003.

*Mobile Attribution Platform & Mobile App Analytics*, Kochava, (7 pages), [online], [retrieved from the Internet Dec. 31, 2019] <https://www.kochava.com/>.

*Probabilistic Programming*, (10 pages), [article, online], [retrieved from the Internet Dec. 31, 2019] <http://www.cs.cornell.edu/courses/cs4110/2016fa/lectures/lecture33.html>.

Cabrera, Derek, *Relationships (R ) Are Not Enough!*, (7 pages), [article, online], [retrieved from the Internet Dec. 31, 2019] <https://stdaily.ghost.io/relationships-r-are-not-enough/>.

*What Is a Graph Database and Property Graph*, Neo4J, (6 pages), [article, online], [retrieved from the Internet Dec. 31, 2019] <https://neo4j.com/developer/graph-database/>.

* cited by examiner

CROSS-SENSOR PREDICTIVE INFERENCE

CROSS-REFERENCES TO RELATED APPLICATIONS

The present application claims priority to U.S. Provisional Patent Application Nos. 62/774,569, 62/774,573, 62/774,579, and 62/774,602, all filed on Dec. 3, 2018, and all of which are incorporated herein by reference in their entireties.

BACKGROUND

Various embodiments of the present invention address technical challenges related to performing sensor-based predictive data analysis. Existing sensor-based predictive data analysis solutions are ill-suited to efficiently and reliably perform such sensor-based predictive data analysis. Various embodiments of the present invention address the shortcomings of noted sensor-based predictive data analysis solutions and disclose various techniques for efficiently and reliably performing sensor-based predictive data analysis.

BRIEF SUMMARY

In general, embodiments of the present invention provide methods, apparatus, systems, computing devices, computing entities, and/or the like efficiently and reliably perform sensor-based predictive data analysis. Certain embodiments utilize systems, methods, and computer program products that perform sensor-based predictive data analysis using at least one of per-sensor feature definition models, per-sensor feature extraction models, and cross-sensor predictive inference models.

In accordance with one aspect, a method is provided. In one embodiment, the method comprises: identifying a plurality of sensor input data objects comprising one or more image data objects; determining a plurality of sensor feature data objects based at least in part on the plurality of sensor input data objects, wherein determining the plurality of sensor feature data objects comprises: (i) for each sensor input data object of the plurality of sensor input data objects, determining one or more desired observation metrics based at least in part on a feature definition model for the sensor input data object; and (ii) for each desired observation metric of the one or more desired observation metrics that is associated with a sensor input data object of the plurality of sensor input data objects, determining a sensor feature data object of the plurality of sensor feature data object by processing the sensor input data object using a feature extraction model of a plurality of feature extraction models that is associated with the sensor input data object, wherein the plurality of feature extraction models comprise one or more image feature extraction models; generating one or more cross-sensor predictions for a target predictive entity associated with the plurality of sensor input data objects by processing the plurality of sensor feature data objects using a cross-sensor predictive inference model; and performing one or more prediction-based actions based at least in part on the one or more cross-sensor predictions.

In accordance with another aspect, a computer program product is provided. The computer program product may comprise at least one computer-readable storage medium having computer-readable program code portions stored therein, the computer-readable program code portions comprising executable portions configured to: identify a plurality of sensor input data objects comprising one or more image data objects; determine a plurality of sensor feature data objects based at least in part on the plurality of sensor input data objects, wherein determining the plurality of sensor feature data objects comprises: (i) for each sensor input data object of the plurality of sensor input data objects, determining one or more desired observation metrics based at least in part on a feature definition model for the sensor input data object; and (ii) for each desired observation metric of the one or more desired observation metrics that is associated with a sensor input data object of the plurality of sensor input data objects, determining a sensor feature data object of the plurality of sensor feature data object by processing the sensor input data object using a feature extraction model of a plurality of feature extraction models that is associated with the sensor input data object, wherein the plurality of feature extraction models comprise one or more image feature extraction models; generate one or more cross-sensor predictions for a target predictive entity associated with the plurality of sensor input data objects by processing the plurality of sensor feature data objects using a cross-sensor predictive inference model; and perform one or more prediction-based actions based at least in part on the one or more cross-sensor predictions.

In accordance with yet another aspect, an apparatus comprising at least one processor and at least one memory including computer program code is provided. In one embodiment, the at least one memory and the computer program code may be configured to, with the processor, cause the apparatus to: identify a plurality of sensor input data objects comprising one or more image data objects; determine a plurality of sensor feature data objects based at least in part on the plurality of sensor input data objects, wherein determining the plurality of sensor feature data objects comprises: (i) for each sensor input data object of the plurality of sensor input data objects, determining one or more desired observation metrics based at least in part on a feature definition model for the sensor input data object; and (ii) for each desired observation metric of the one or more desired observation metrics that is associated with a sensor input data object of the plurality of sensor input data objects, determining a sensor feature data object of the plurality of sensor feature data object by processing the sensor input data object using a feature extraction model of a plurality of feature extraction models that is associated with the sensor input data object, wherein the plurality of feature extraction models comprise one or more image feature extraction models; generate one or more cross-sensor predictions for a target predictive entity associated with the plurality of sensor input data objects by processing the plurality of sensor feature data objects using a cross-sensor predictive inference model; and perform one or more prediction-based actions based at least in part on the one or more cross-sensor predictions.

BRIEF DESCRIPTION OF THE DRAWINGS

Figure 1:
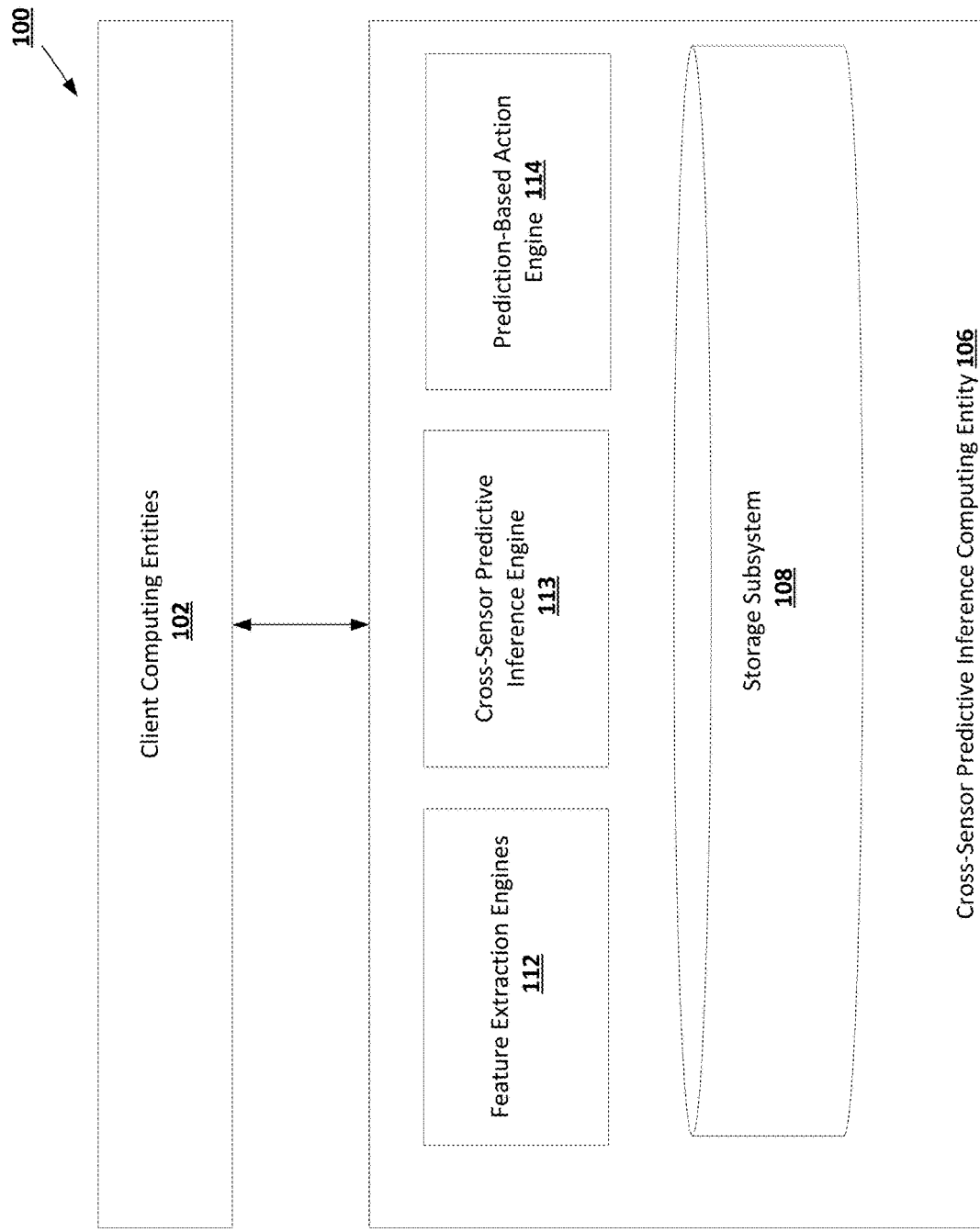

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
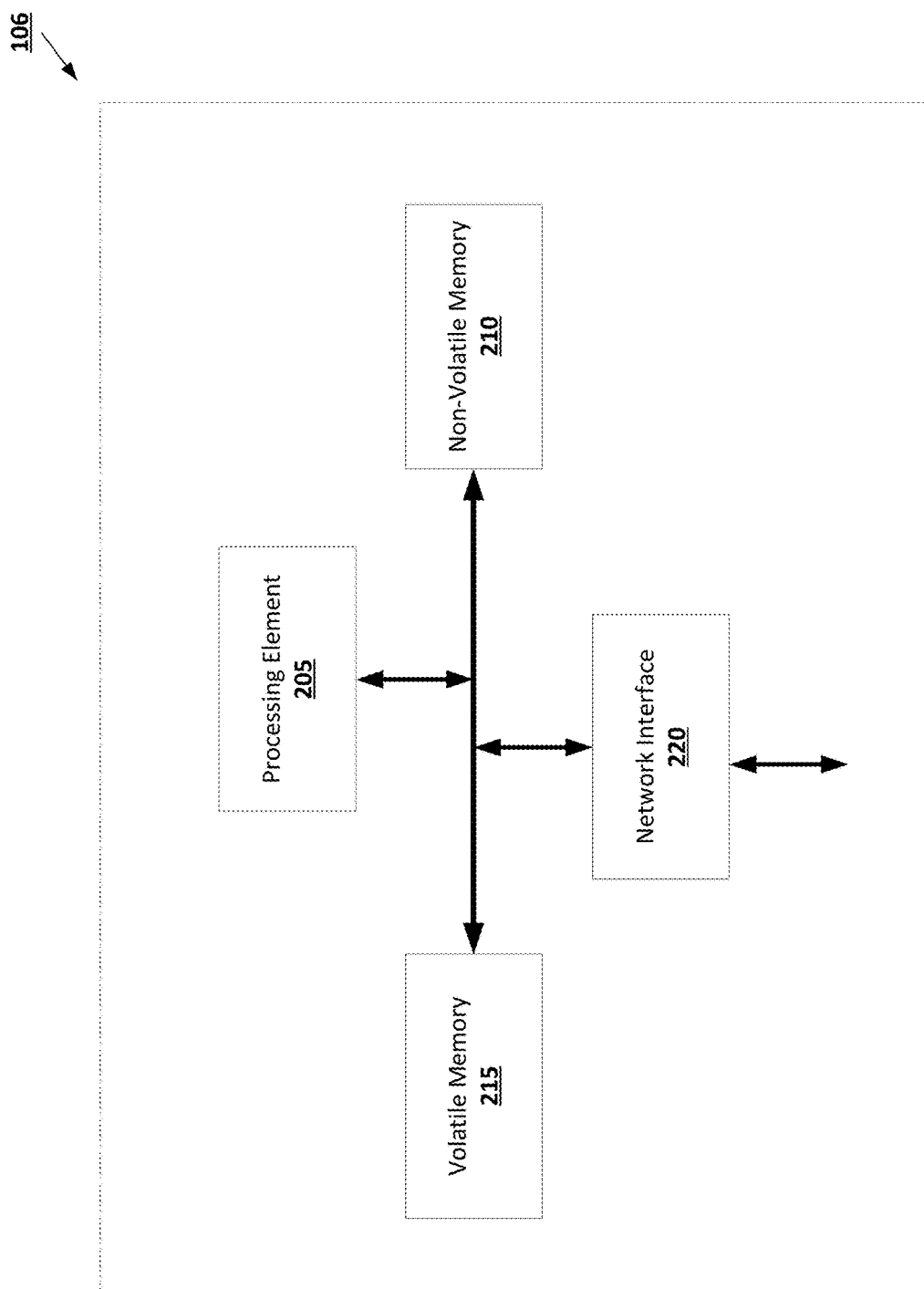

FIG. 2 provides an example cross-sensor predictive inference computing entity in accordance with some embodiments discussed herein.

Figure 3:
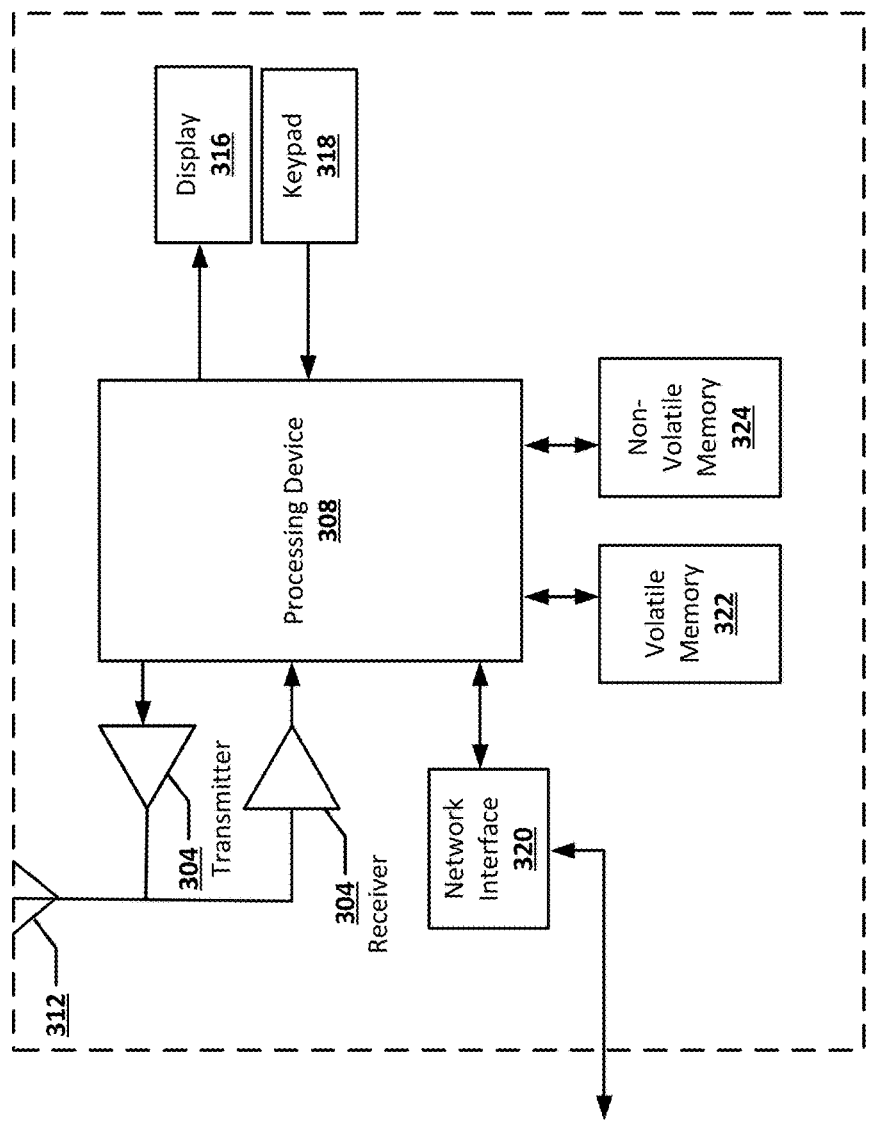

FIG. 3 provides an example client computing entity in accordance with some embodiments discussed herein.

Figure 4:
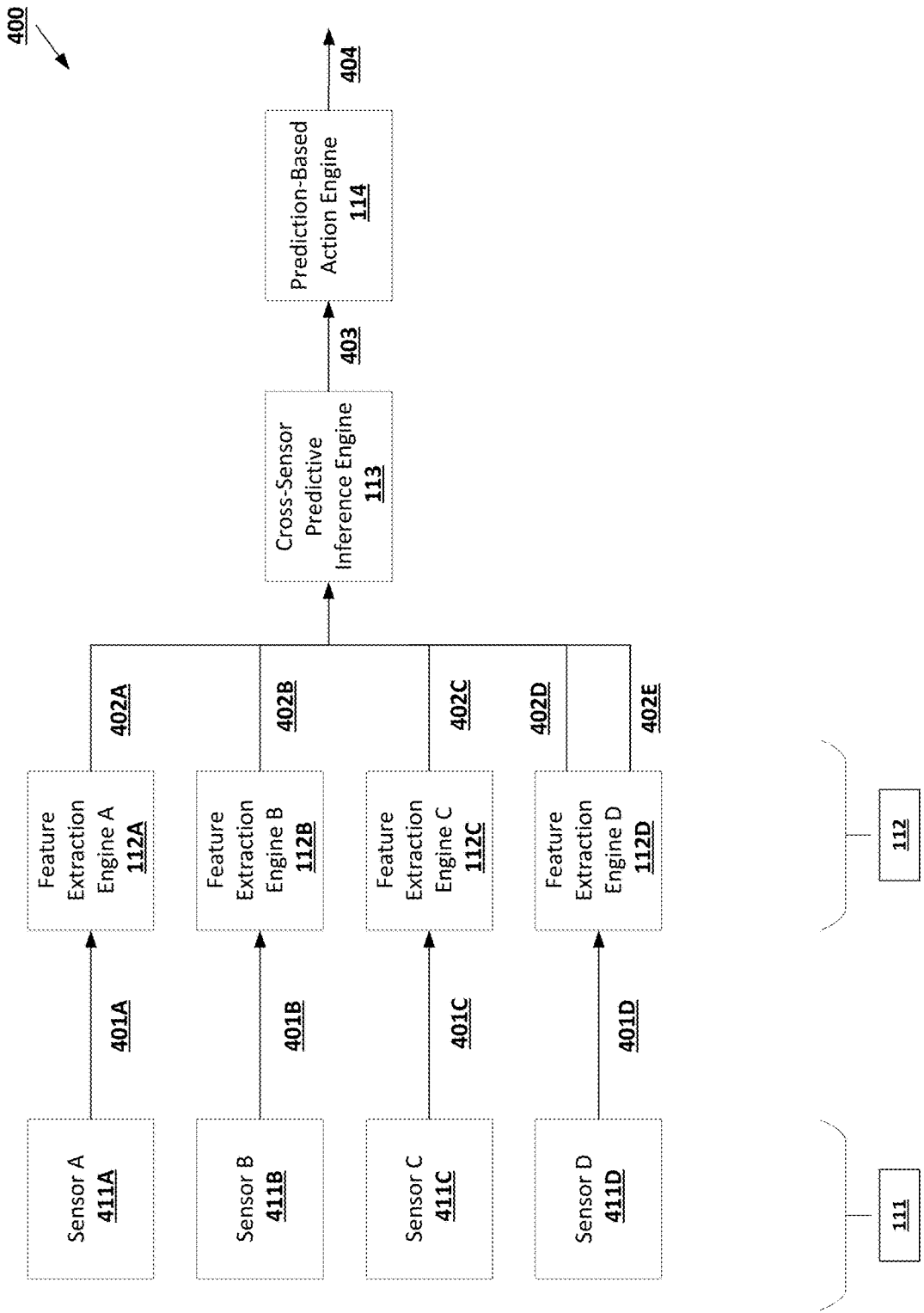

FIG. 4 is a data flow diagram of an example process for performing cross-sensor predictive inference in accordance with some embodiments discussed herein.

Figure 5:
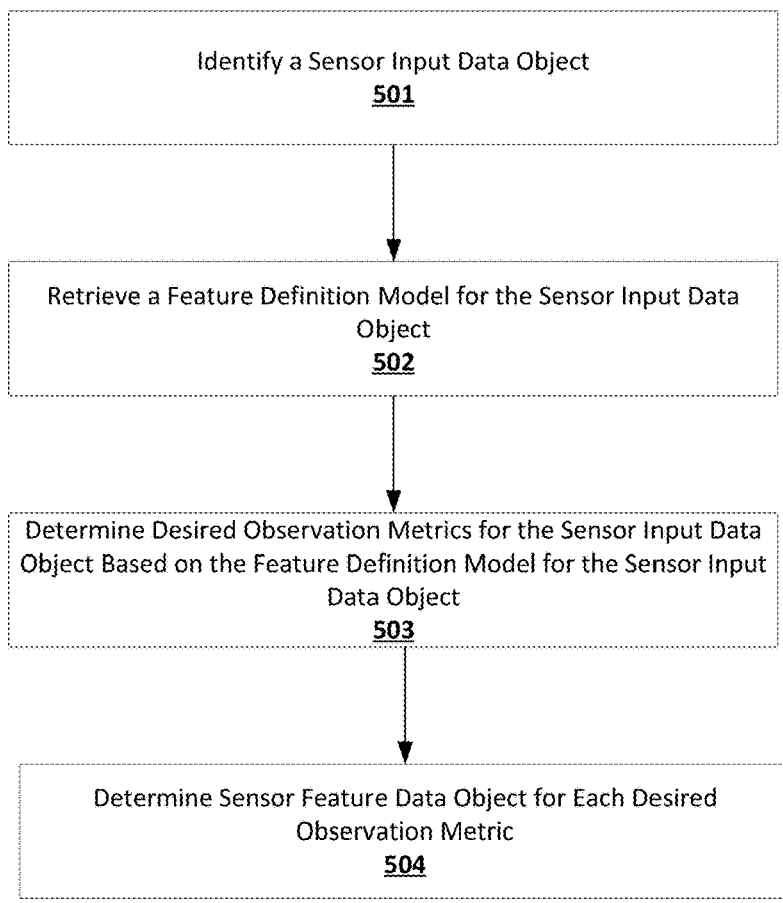

FIG. 5 is a flowchart diagram of an example process for determining sensor feature data objects in accordance with some embodiments discussed herein.

Figure 6:
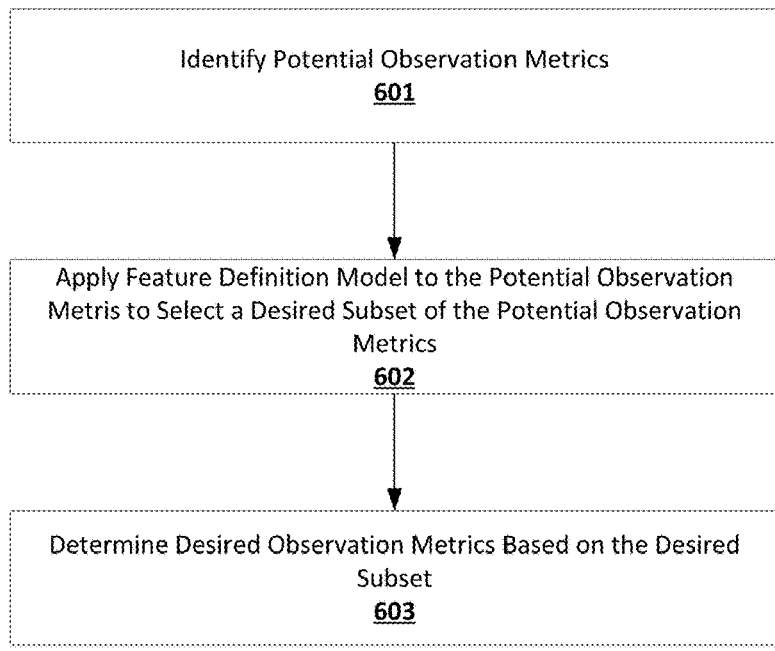

FIG. 6 is a flowchart diagram of an example process for determining desired observation metrics for a sensor input data object in accordance with some embodiments discussed herein.

Figure 7:
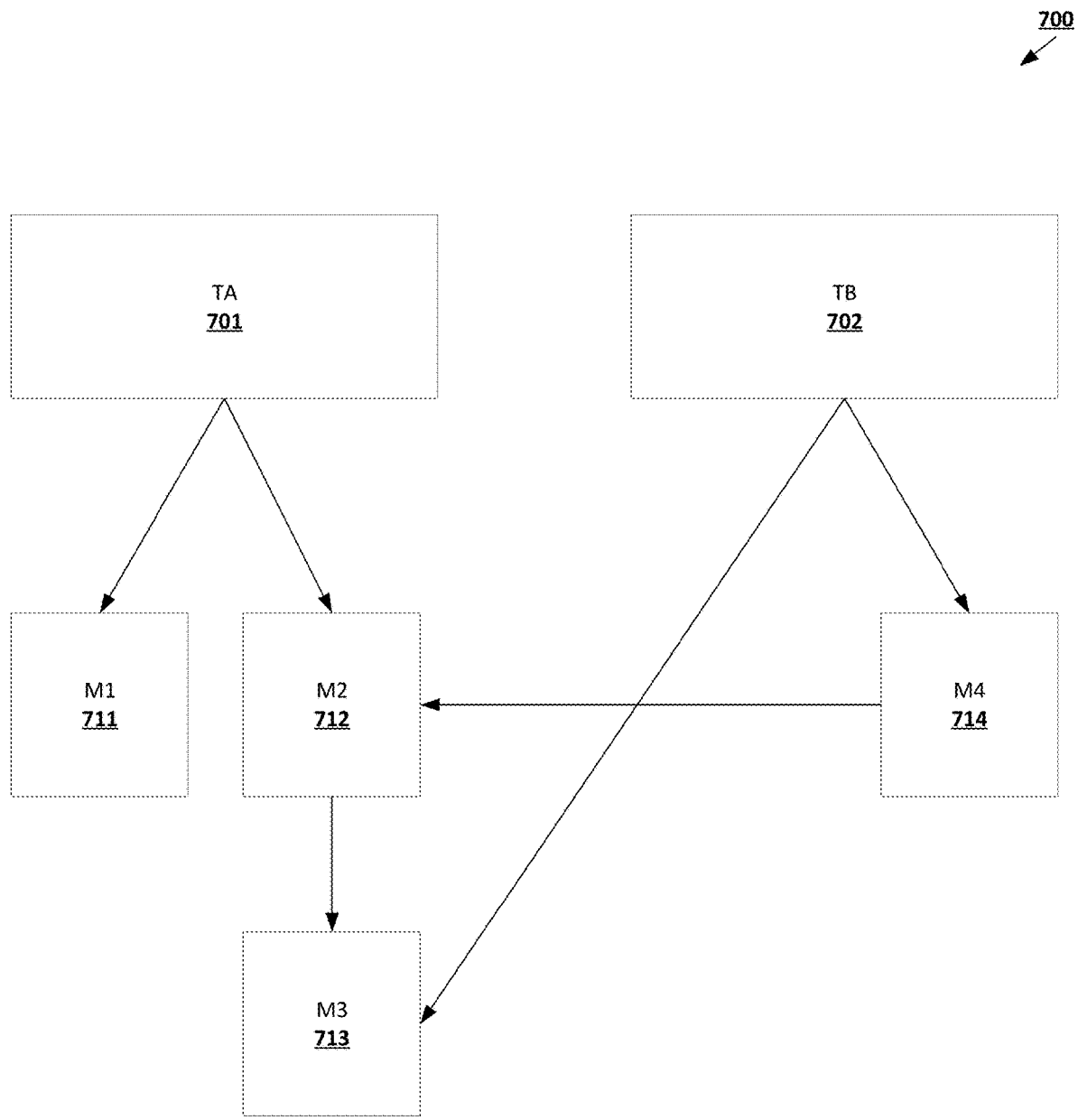

FIG. 7 provides an operational example of a hierarchical feature definition model for a sensor input data object in accordance with some embodiments discussed herein.

Figure 8:
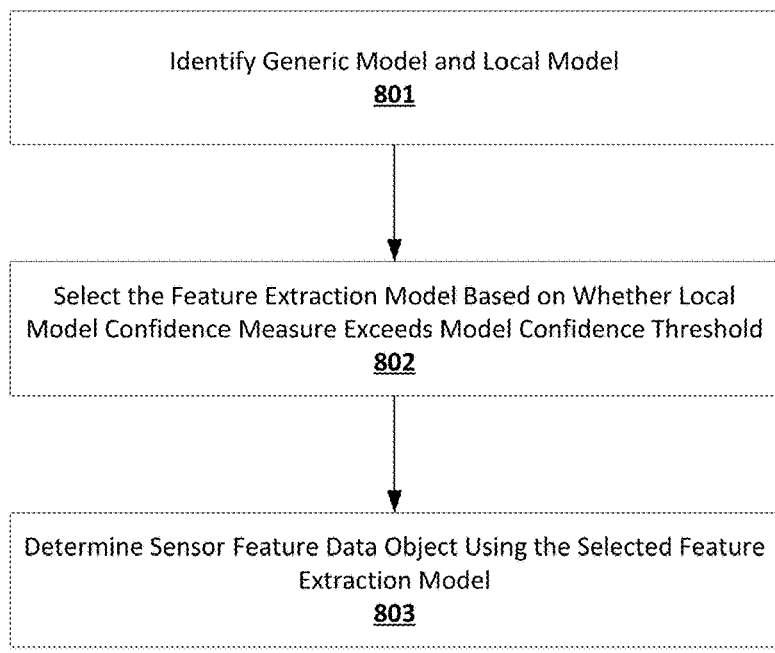

FIG. 8 is a flowchart diagram of an example process for determining sensor feature data objects using qualified model localization in accordance with some embodiments discussed herein.

Figure 9:
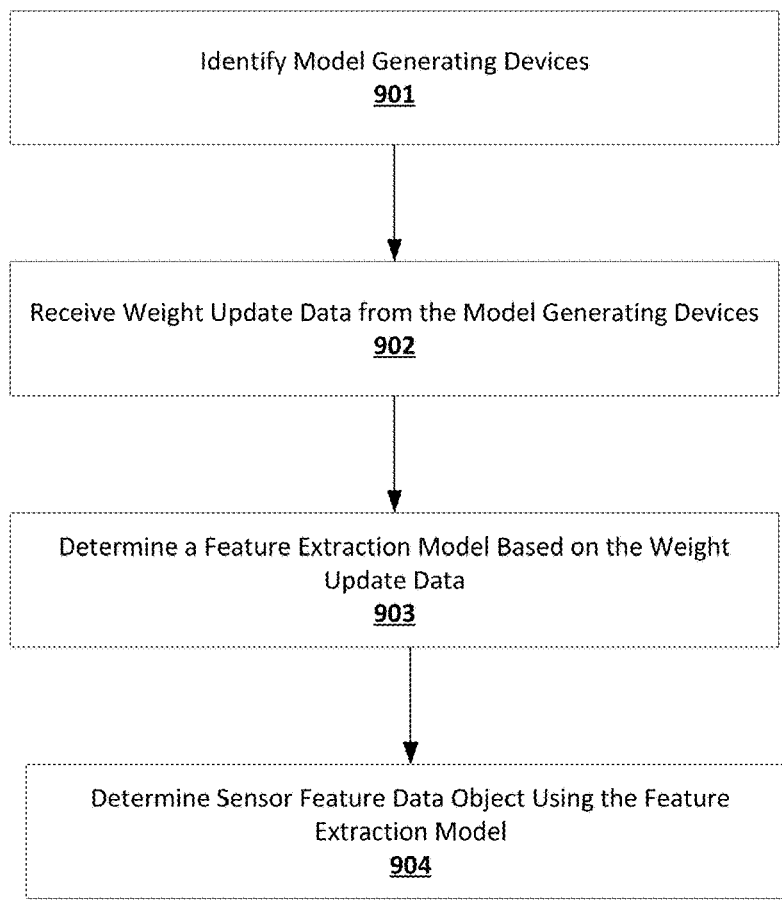

FIG. 9 is a flowchart diagram of an example process for determining sensor feature data objects using federated learning in accordance with some embodiments discussed herein.

Figure 10:
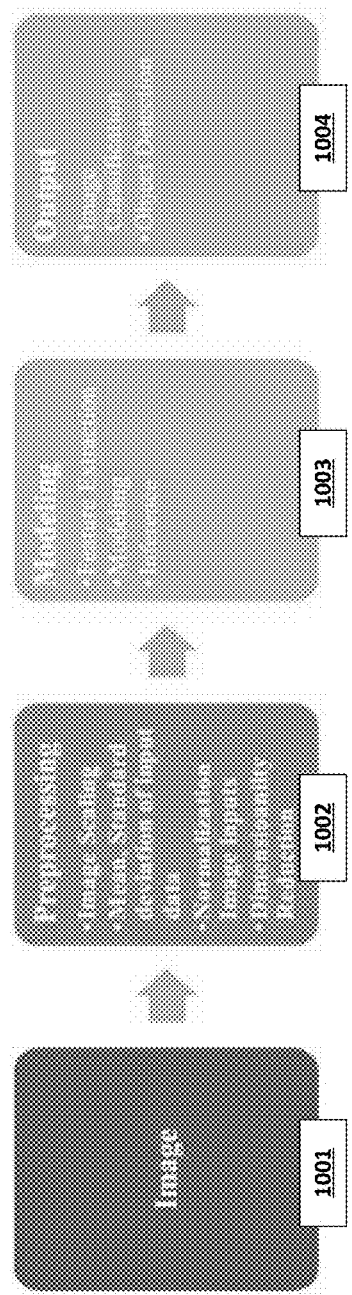

FIG. 10 is a data flow diagram of an example process for determining image-based sensor feature data objects in accordance with some embodiments discussed herein.

Figure 11:

FIG. 11 provides an operational example of an image-based object detection output in accordance with some embodiments discussed herein.

Figure 12:
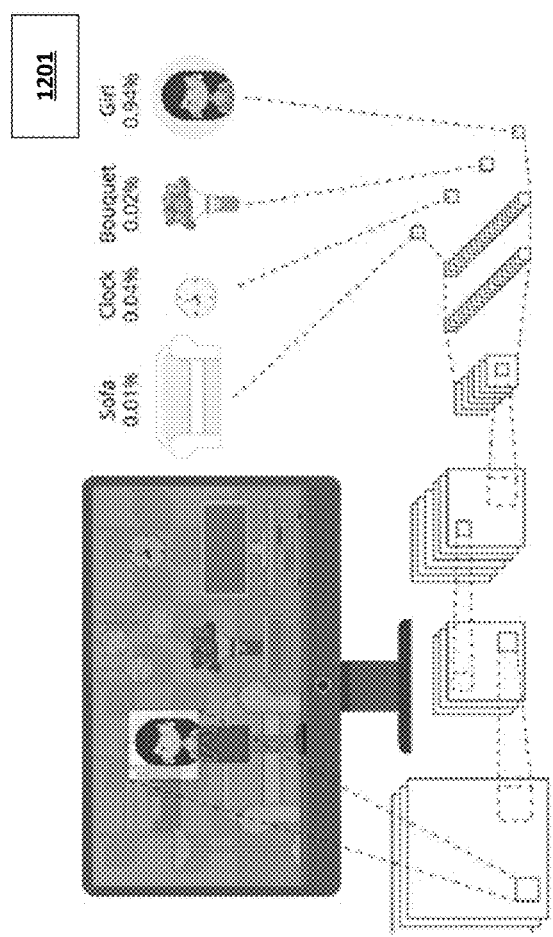

FIG. 12 provides an operational example of a probabilistic image-based object detection output in accordance with some embodiments discussed herein.

Figure 13:
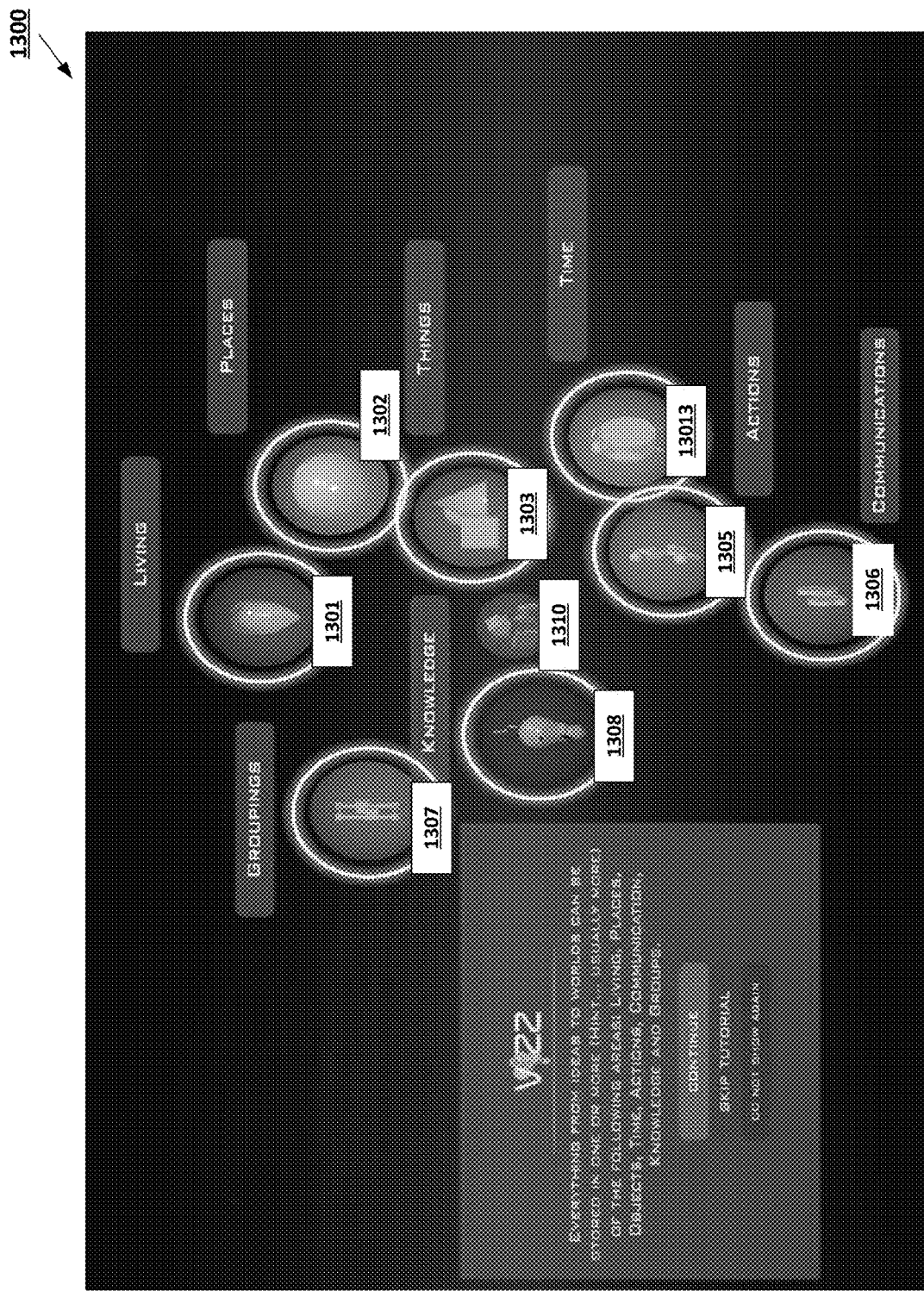

FIG. 13 provides an operational example of a user interface for a data interaction platform in accordance with some embodiments discussed herein.

Figure 14:
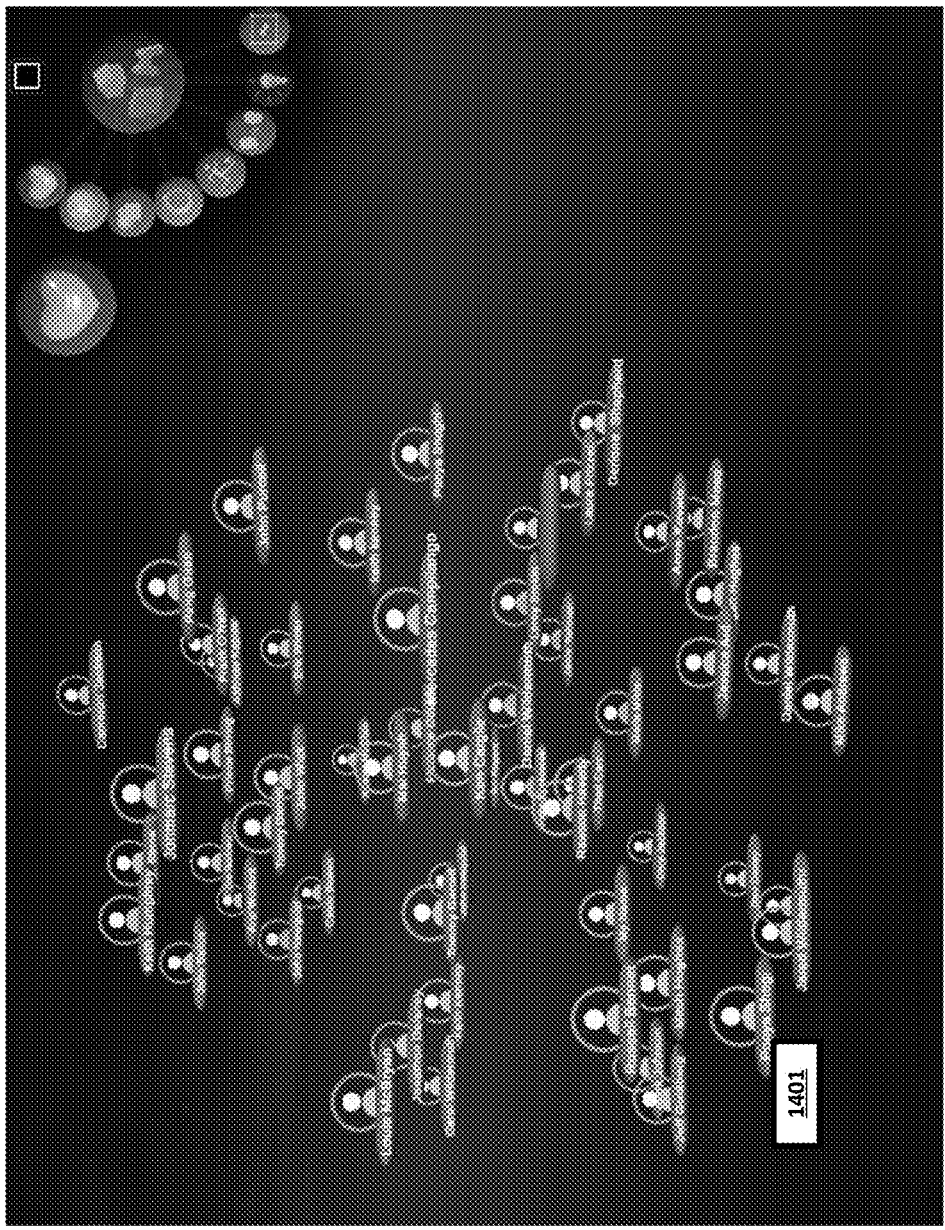

FIG. 14 provides an operational example of a user interface for a multi-object visualization space for various living data objects in accordance with some embodiments discussed herein.

Figure 15:
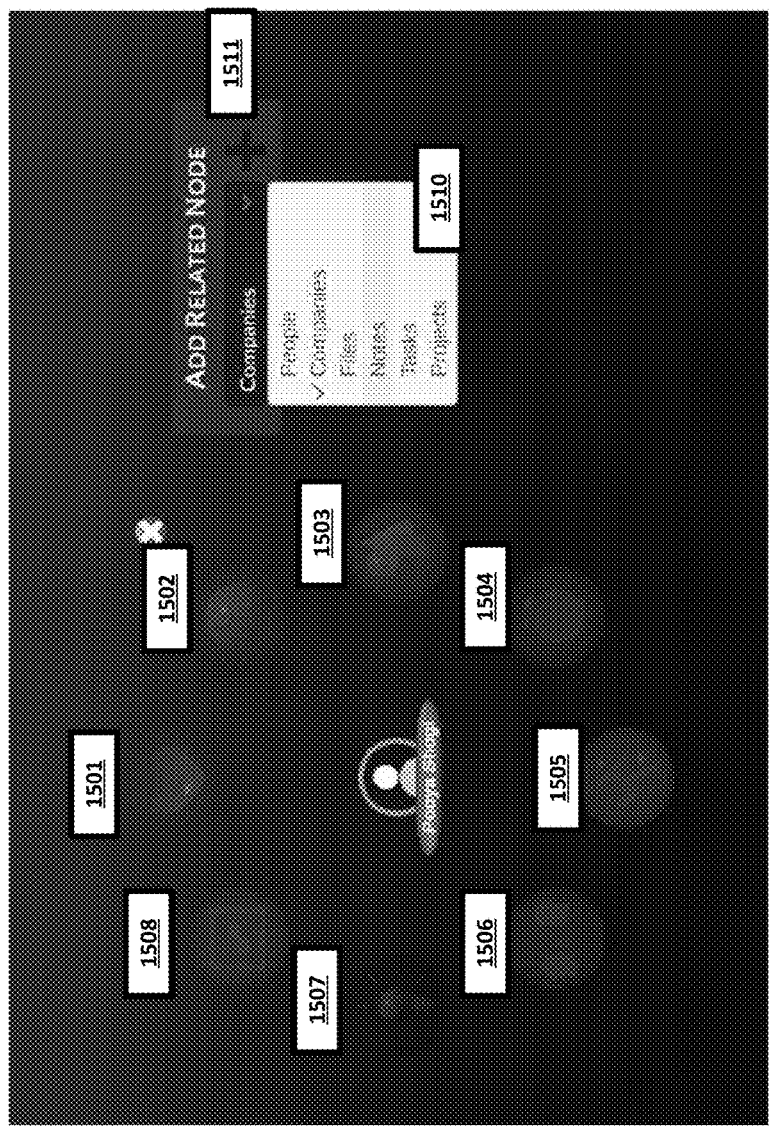

FIG. 15 provides an operational example of a user interface for a per-object visualization space for a living data object in accordance with some embodiments discussed herein.

Figure 16:
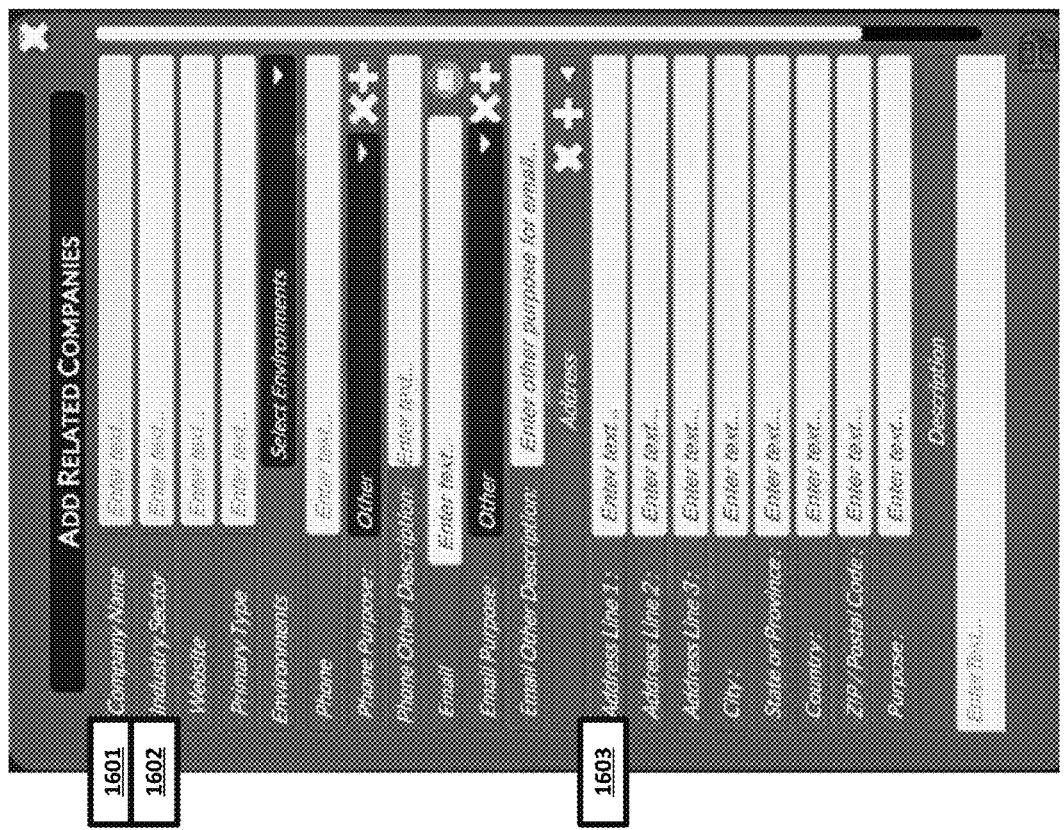

FIG. 16 provides an operational example of a user interface for adding a data object to a data model in accordance with some embodiments discussed herein.

Figure 17:
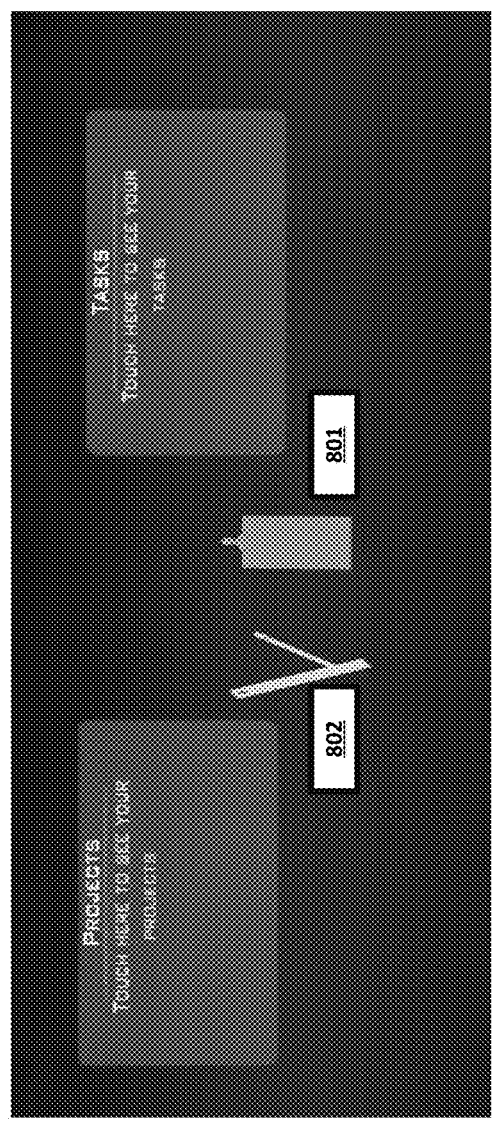

FIG. 17 provides an operational example of a user interface for hierarchical division of actions data objects in accordance with some embodiments discussed herein.

Figure 18:
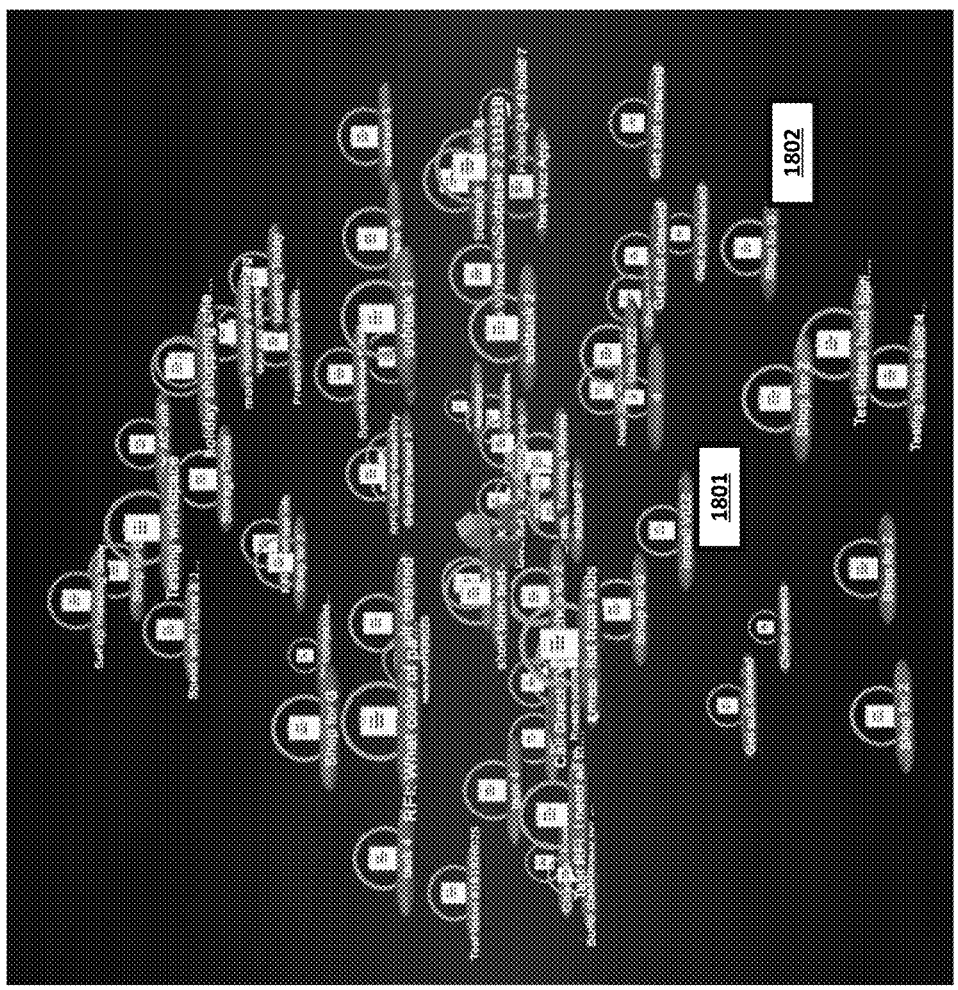

FIG. 18 provides an operational example of a user interface for a multi-object visualization space for various tasks data objects in accordance with some embodiments discussed herein.

Figure 19:
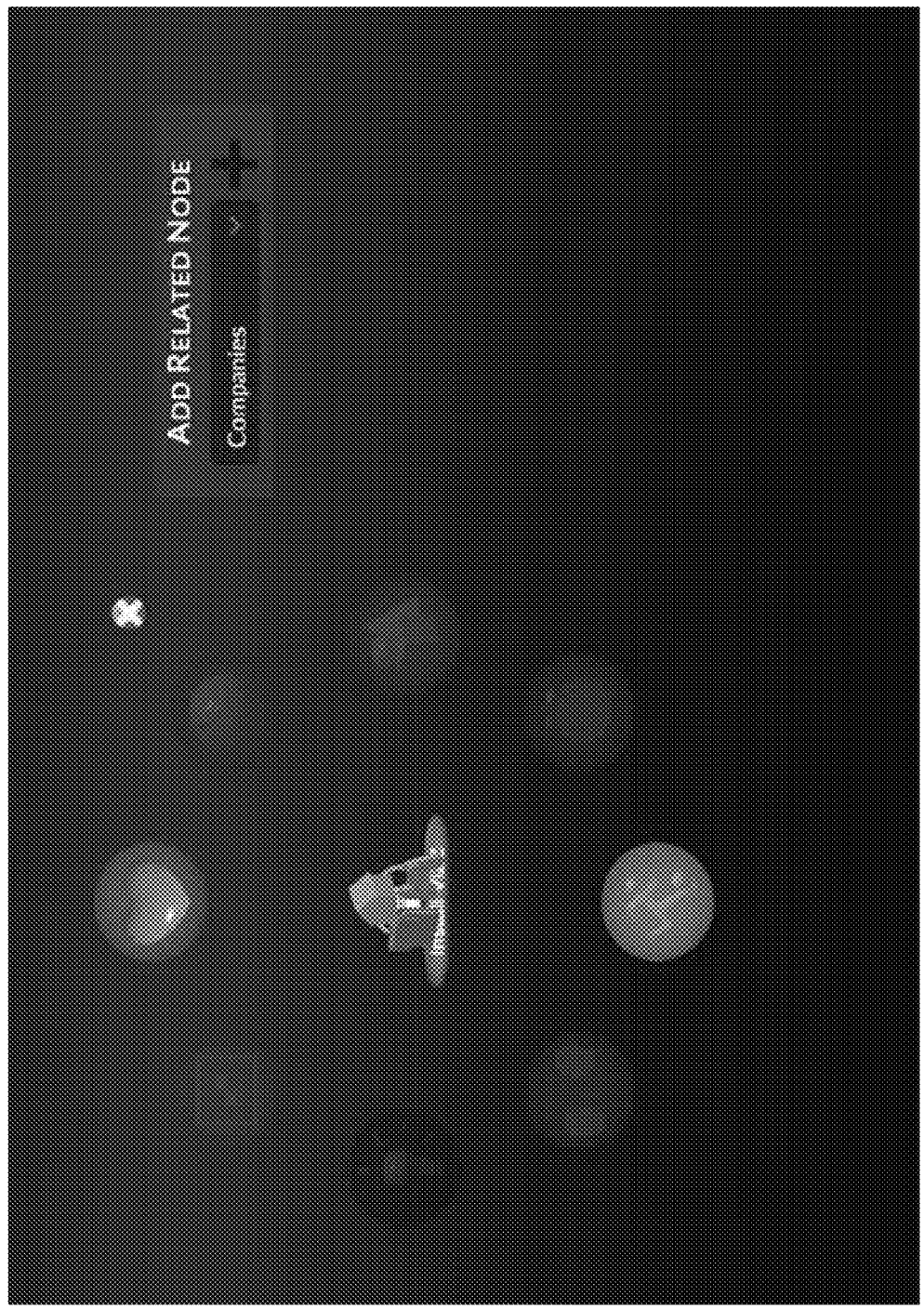

FIG. 19 provides an operational example of a user interface for a per-object visualization space for a tasks data object in accordance with some embodiments discussed herein.

Figure 20:
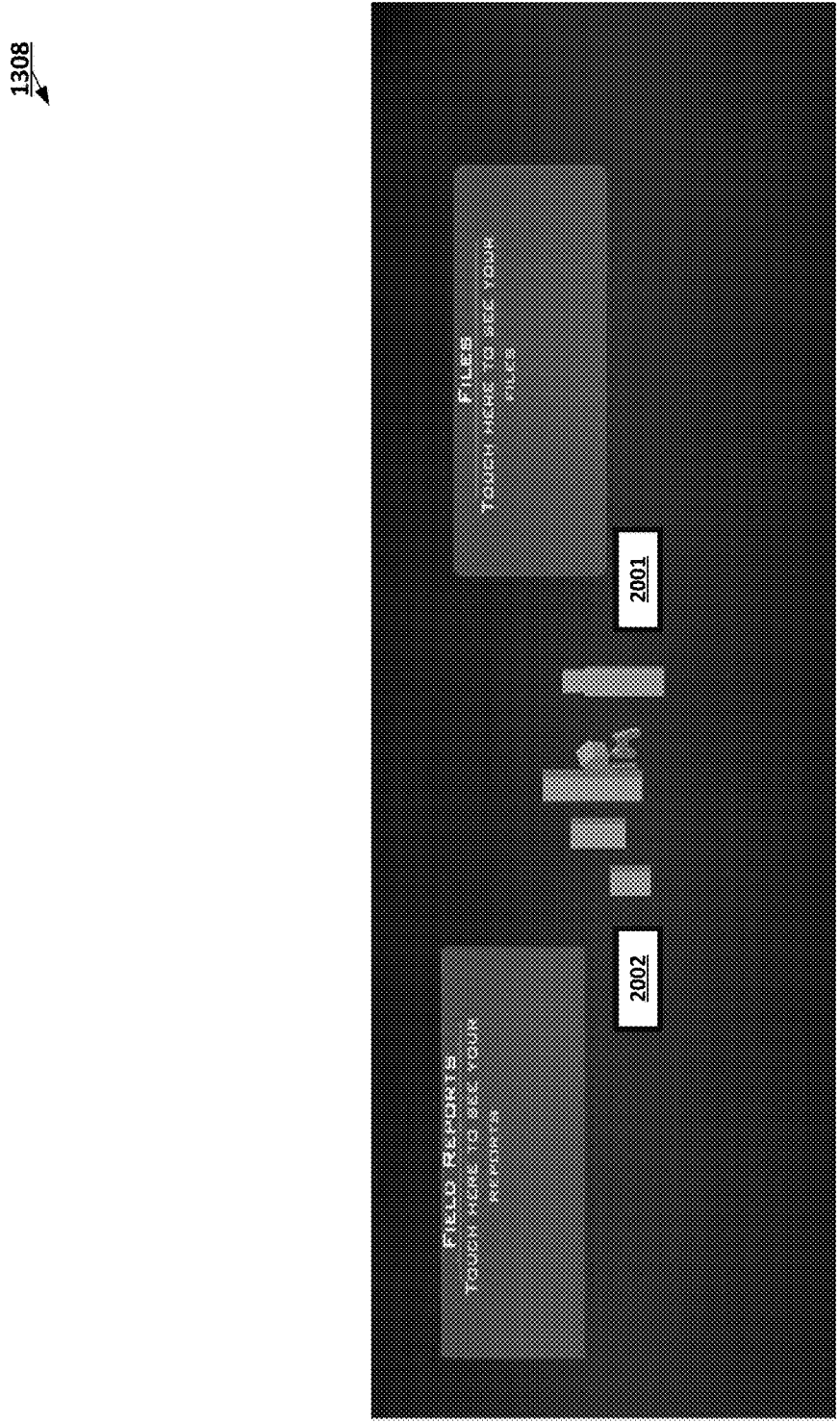

FIG. 20 provides an operational example of a user interface for hierarchical division of knowledge data objects in accordance with some embodiments discussed herein.

Figure 21:
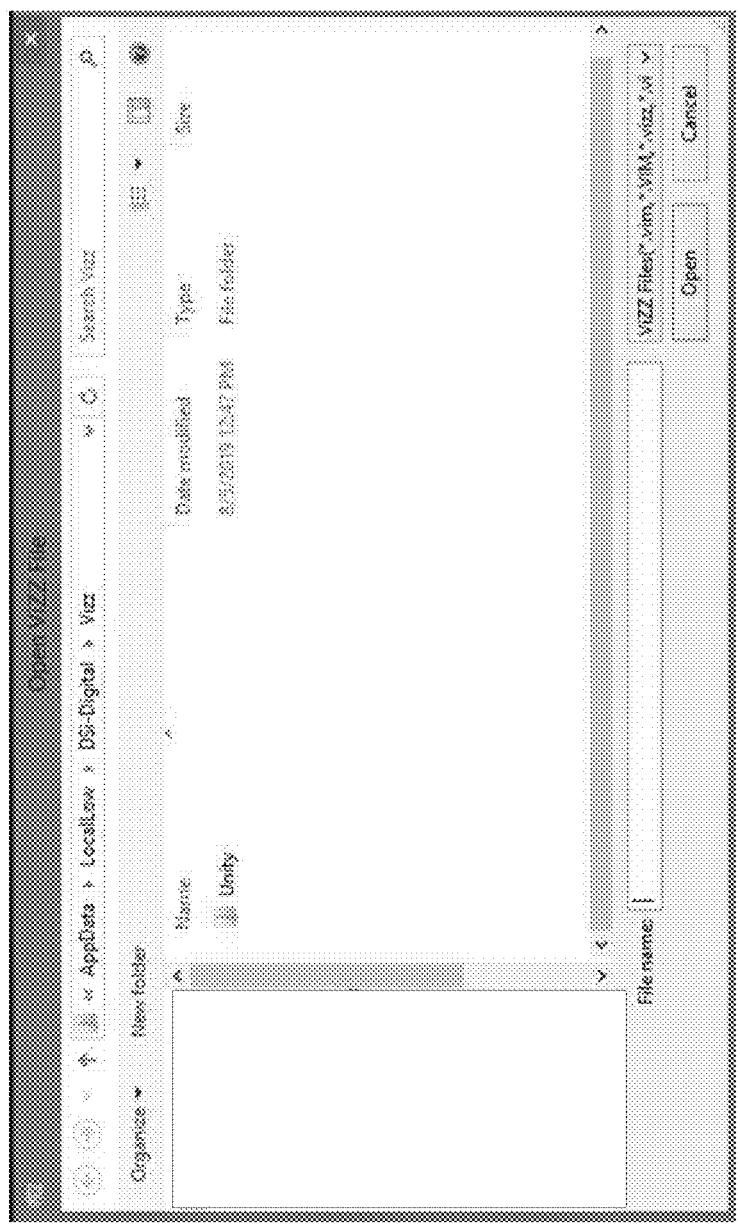

FIG. 21 provides an operational example of a user interface of a file selection user interface for accessing things data objects in accordance with some embodiments discussed herein.

Figure 22:
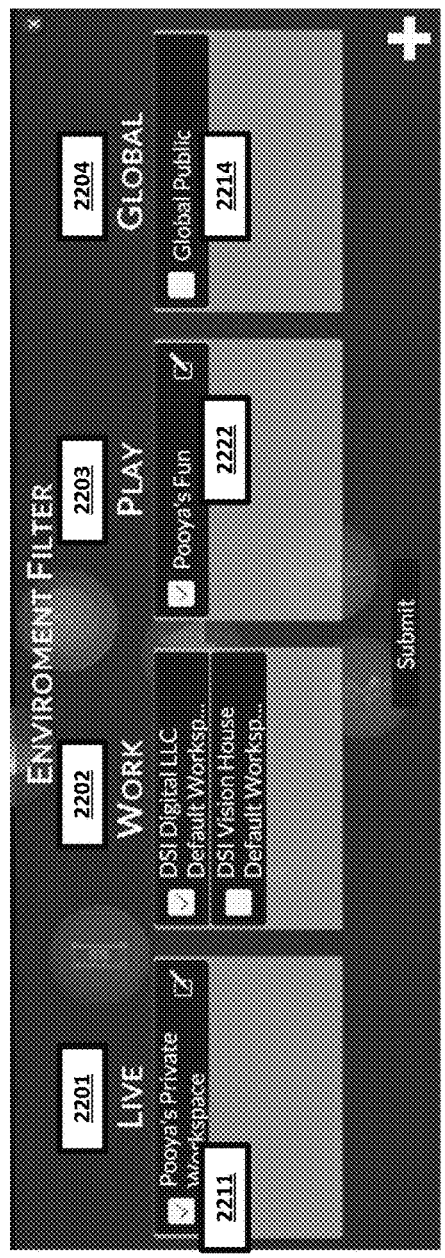

FIG. 22 provides an operational example of a user interface that enables user selection of environment states for a data interaction platform in accordance with some embodiments discussed herein.

Figure 23:
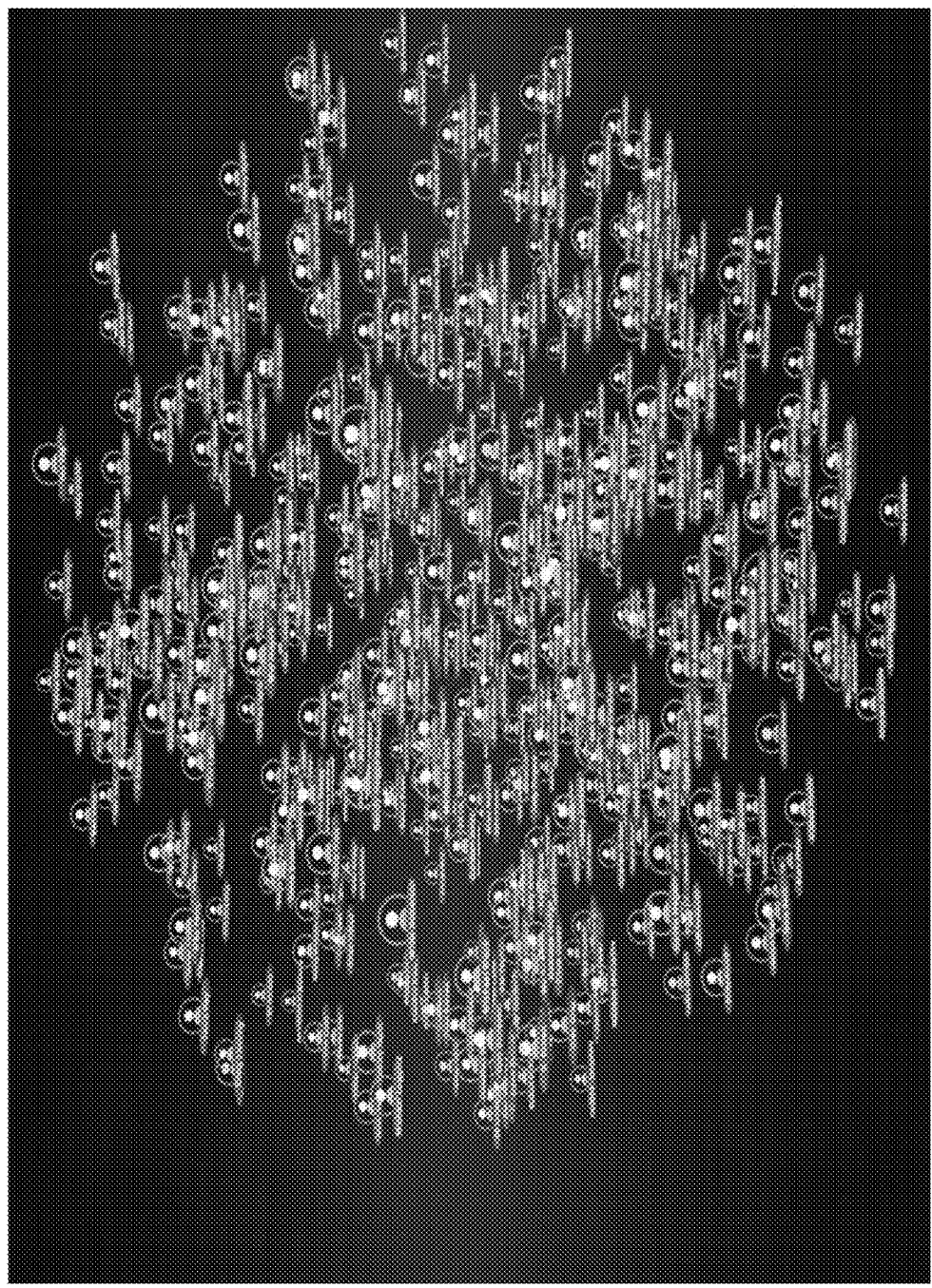

FIG. 23 provides another operational example of a user interface for a multi-object visualization space for various living data objects in accordance with some embodiments discussed herein.

Figure 24:
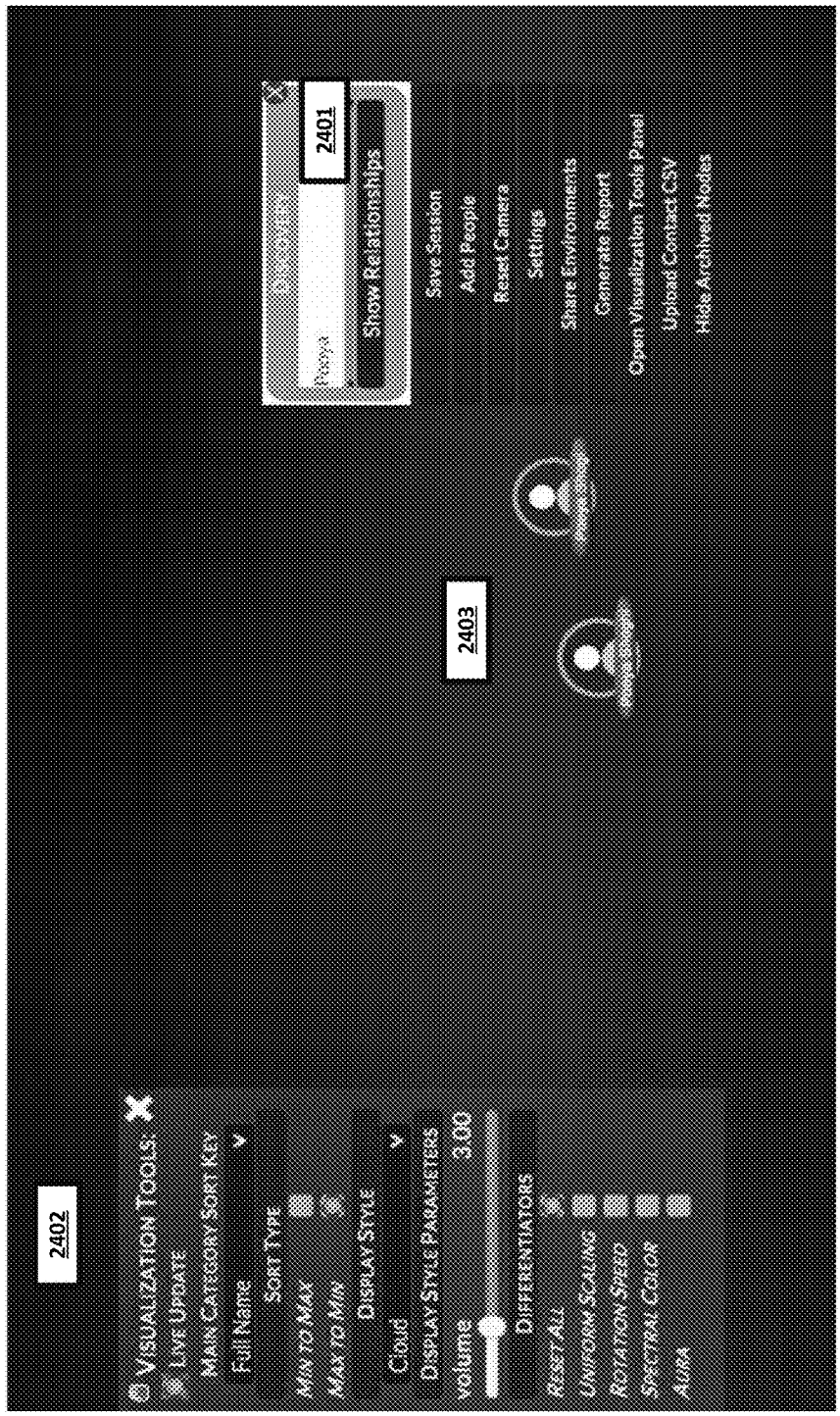

FIG. 24 provides an operational example of a user interface for displaying data object results of a data retrieval query in accordance with some embodiments discussed herein.

Figure 25:
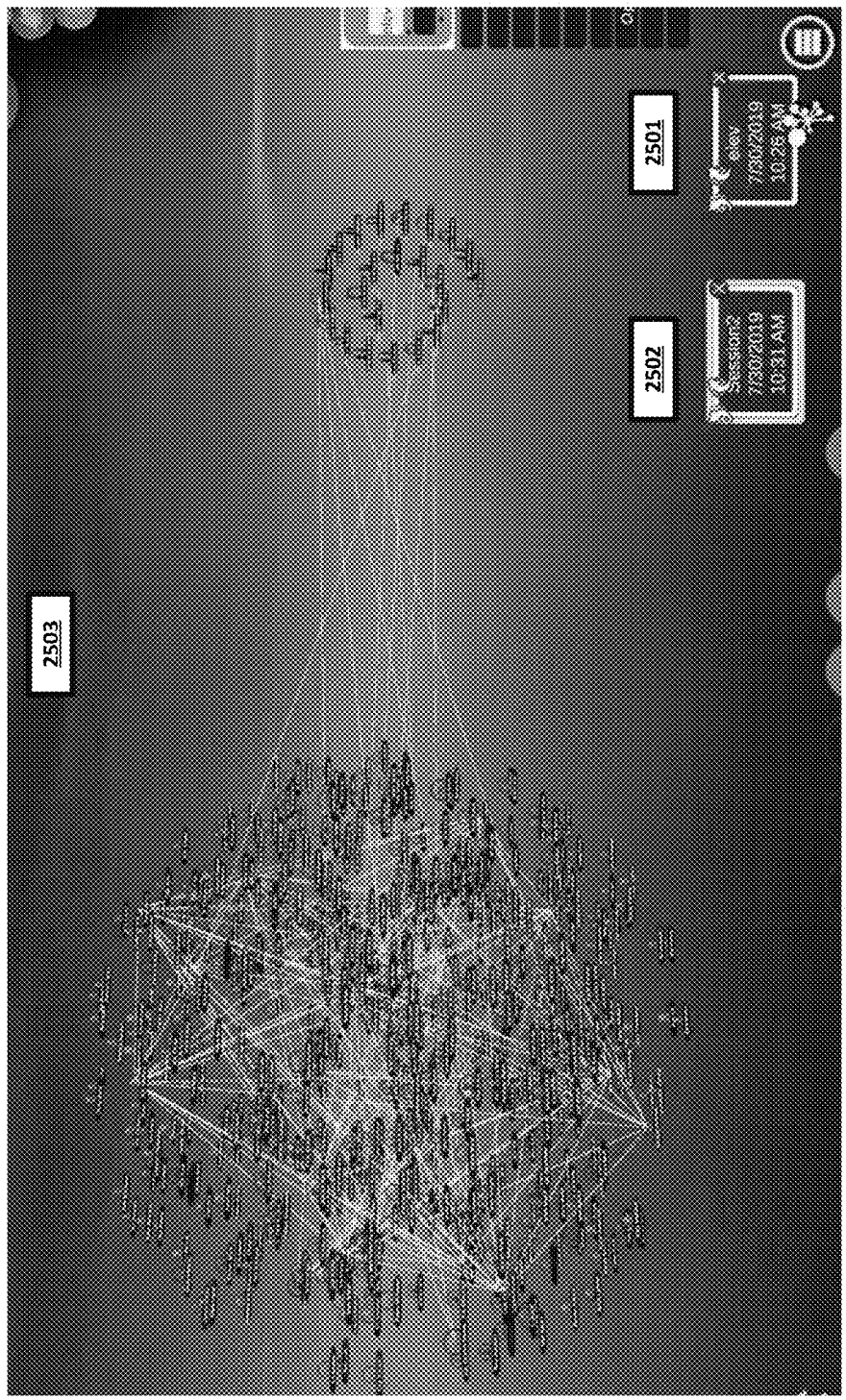

FIG. 25 provides an operational example of a user interface for displaying data object results and data object relationship results of a data retrieval query in accordance with some embodiments discussed herein.

Figure 26:
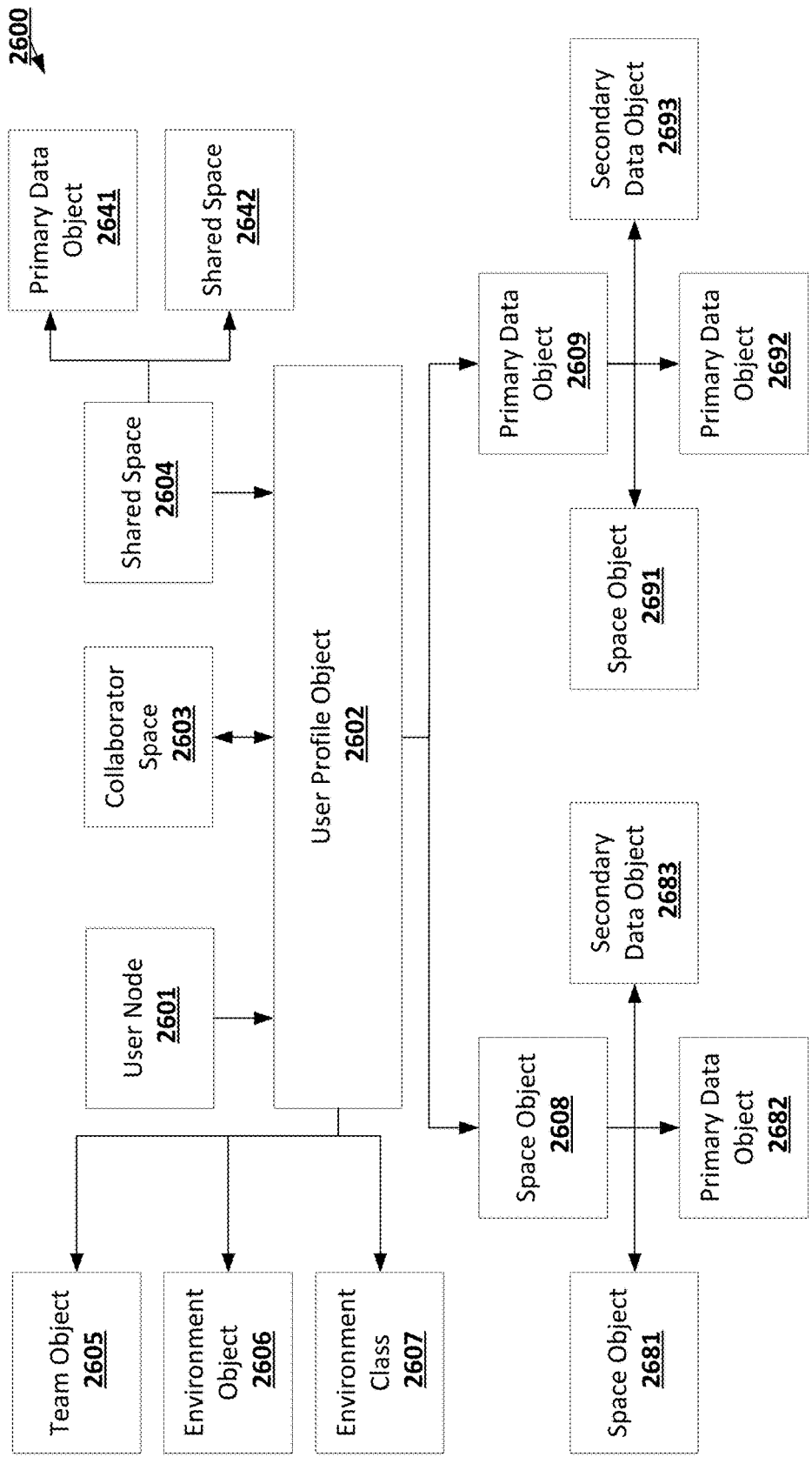

FIG. 26 is a logical data flow diagram for a data interaction system utilizing dynamic relational awareness in accordance with some embodiments discussed herein.

Figure 27:
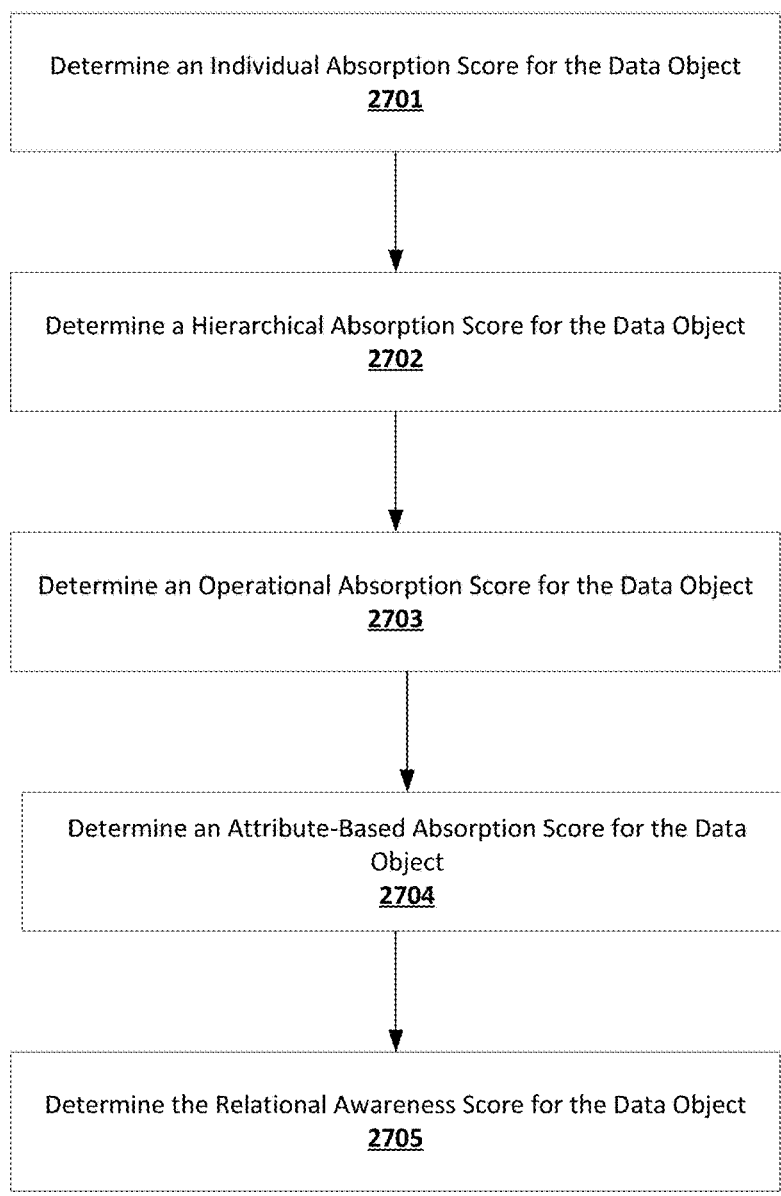

FIG. 27 is a flowchart diagram of an example process for determining relational awareness scores for data objects stored in a data interaction platform in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. OVERVIEW

Various embodiments of the present invention address scalability challenges associated with performing predictive data analysis using sensory data from multiple sensor devices. Many existing sensor-based predictive data analysis systems face substantial challenges when it comes to efficiently and reliably combining per-sensor predictive signals to generate coordinated cross-sensor predictive signals. Such challenges increase when the number of sensors and thus the sensor complexity of the underlying predictive inference problem increases. The resulting dilemma has made various existing sensor-based predictive data analysis systems inefficient and ineffective for predictive inference spaces that are associated with a large number of sensor devices.

Various embodiments of the present invention address the above-described scalability challenges of sensor-based predictive data analysis models by tuning per-sensor predictive inferences based on sensor-specific feature definition models that integrate relevant information associated with a predictive inference problem to individual per-sensor predictive inference routines. In some embodiments, the noted tuning is performed using per-sensor desired observation metrics defined using per-sensor feature definition models. Utilizing sensor-specific feature definition models to define desired observation metrics for various sensors provides an intuitive and scalable method of integrating cross-sensor considerations while performing per-sensor predictive inferences. In this way, the operational integrity of per-sensor feature extractions is maintained, while cross-sensor signals are integrated as non-intrusive and non-structure-changing output-defining parameters of per-sensor feature extraction models. This innovative feature in turn addresses scalability challenges of sensor-based predictive data analysis systems and makes important contributions to efficiency and effectiveness of sensor-based predictive data analysis systems having a large number of sensors.

Moreover, various embodiments of the present invention address the above-described scalability challenges of sensor-based predictive data analysis systems by generating cross-sensor predictions based on features extracted on a per-sensor level. In this way, the noted embodiments can utilize state-of-the-art sensor-specific feature extraction techniques (e.g., convolutional neural networks for image sensors) while combining, using an intelligent ensemble model, per-sensor predictions in order to generate cross-sensor predictions. The resulting cross-sensor predictions show a strong average accuracy level that results from robustness of underlying sensor-specific model as well as the flexibility and strength of the cross-sensor ensemble models. This innovative feature also addresses scalability challenges of sensor-based predictive data analysis systems and makes important contributions to efficiency and effectiveness of sensor-based predictive data analysis systems having a large number of sensors.

Moreover, various embodiments of the present invention address technical shortcomings of traditional graph-based databases. For example, various embodiments of the present invention introduce innovative data models that process relationships between data objects not as static associations that are recorded independent of those data objects, but as dynamic associations that are recorded and absorbed by the data objects according to various attributes of those data objects. According to some aspects, a data object has relational awareness score with respect to each of its associated data object relationships. This allows the data object to have an independent recognition of various data object relationships, including data object relationships that are typically modeled indirect data object relationships in traditional graph models, while being able to distinguish between more significant data object relationships (e.g., data object relationships having higher respective relational awareness scores) and less significant data object relationships (e.g., data object relationships having lower respective relational awareness scores). Thus, varying, real-time relational scores and the ability of objects to understand alterations in themselves based on the variations of related objects, and the alteration of other objects based on variations of themselves, in a real-time or near-real-time manner, allows information to become contextually relevant and therefore more valuable.

II. DEFINITIONS OF CERTAIN TERMS

The term "sensor input data object" may refer to data that describes one or more real-world observations by a sensor about a physical environment. Examples of sensor input data objects include image data objects recorded by an image sensor (e.g., a camera), temperature data objects recorded by a thermometer, proximity data objects recorded by a proximity sensor, acceleration data objects record by an accelerometer, pressure data objects recorded by a pressure sensor, position data objects recorded by a position sensor, etc.

The term "desired observation metric" may refer to data that describes a real-world phenomenon, where the noted data is expected to be extractable from a corresponding sensor input data object. For example, a first desired observation metric for an image data object may describe the real-world phenomenon of the average occupancy of a physical environment associated with the image data object over a period of time. As another example, a second observation metric for an image data object may describe the real-world phenomenon of the average lighting of a physical environment associated with the image data object over a period of time. As yet another example, a third observation metric for an image data object may describe the real-world phenomenon of positions of one or more objects in a physical environment associated with the image data object over a period of time. As a further example, a fourth observation metric for an image data object may describe the real-world phenomenon of usages of one or more objects in a physical environment associated with the image data object over a period of time.

The term "feature definition model" may refer to data that describes what desired observation metrics to extract from a corresponding sensor input data object based on one or more properties of the corresponding sensor data object (e.g., a format of the corresponding sensor data object) and/or one or more inferential properties of a target predictive entity associated with the corresponding sensor data object. In some embodiments, the feature definition model may be a static feature definition model and/or a dynamic feature definition model. A static feature definition model defines, for a corresponding sensor input data object, a set of desired observation metrics to extract from the corresponding sensor input data object at all times. For example, a static feature definition model for an image data object may instruct that image data object should always be configured to extract occupancy levels for a corresponding physical environment. A dynamic feature definition model defines, for a corresponding sensor input data object, a set of desired observation metrics to extract from the sensor input data object, where the set of desired observation metrics is determined at least in part based on guidelines that condition applicability of some desired observation metrics on proper detection and/or proper detection of particular values of feature data corresponding to other desired observation metrics. For example, a dynamic feature definition model for an image data object may instruct that, if the image data object indicates an acceptable detection of sufficient lighting for a corresponding physical environment, then the image data object should be configured to extract a desired observation metric related to occupancy of the corresponding physical environment. In some embodiments, a feature definition model for a sensor input data object may be determined based at least in part on the sensor associated with the sensor input data object. For example, all image data objects by any image sensor and/or all image data objects associated with one or more designated sensors may be associated with a common feature definition model, e.g., a common dynamic feature definition model.

The term "sensor feature data object" may refer to data that describes an extracted value of a desired observation metric for a sensor input data object based on the sensor input data object. For example, if a desired observation metric for an image data object is an estimated average occupancy of a corresponding physical environment over a period of time, the sensor feature data object may be a conclusion regarding the estimated average occupancy of the corresponding physical environment over the period of time determined based on processing the noted image data object. As another example, if a desired observation metric for an image data object is an estimated average lighting of a corresponding physical environment over a period of time, the sensor feature data object may be a conclusion regarding the estimated average lighting of the corresponding physical environment over the period of time determined based on processing the noted image data object. As a further example, if a desired observation metric for an image data object is an estimated average usage of a particular object in a corresponding physical environment over a period of time, the sensor feature data object may be a conclusion regarding the estimated average usage of the particular object in the corresponding physical environment over the period of time determined based on processing the noted image data object.

The term "feature extraction model" may refer to data that describes parameters and/or hyper-parameters of any inferential model configured to extract one or more sensor feature data objects from one or more sensor input data objects. Examples of feature extraction models include machine learning models such as neural network models. In some embodiments, the feature extraction models include image feature extraction models. In some of those embodiments, image feature extraction models include one or more convolutional neural networks, capsule-based machine learning models (e.g., capsule-based convolutional neural networks such as CapsNet), etc. In general, parameters and/or hyper-parameters of a feature extraction model may be determined statically, dynamically, and/or using a training algorithm (e.g., an optimization-based training algorithm, such as gradient descent, gradient descent with backpropagation, gradient descent with backpropagation through time, etc.).

The term "cross-sensor predictive inference model" may refer to data that describes parameters and/or hyper-parameters of any inferential model configured to process two or more sensor feature data objects in order to generate cross-sensor predictions regarding a target predictive entity associated with the sensor input data objects. For example, a cross-sensor predictive inference model may be configured to utilize an image-based sensor feature data object describing average occupancy of a particular physical environment, an image-based sensor feature data object describing average lighting of the particular physical environment, a temperature-based sensor feature data object describing average temperature of the particular physical environment, and a pressure-based sensor feature data object describing average occupancy of the particular physical environment (e.g., based on estimating pressure extracted on a particular pressure-recording spot in the particular physical environment such as entrance area of the particular physical environment) to determine a predicted comfort level for the particular physical environment. As another example, a cross-sensor predictive inference model may be configured to utilize an image-based sensor feature data object describing average occupancy of a particular physical environment, an image-based sensor feature data object describing average lighting of the particular physical environment, a temperature-based sensor feature data object describing average temperature of the particular physical environment, and a pressure-based sensor feature data object describing average occupancy of the particular physical environment to determine a predicted maintenance need for an air-conditioning system in the particular physical environment. As yet another example, a cross-sensor predictive inference model may be configured to utilize an image-based sensor feature data object describing average occupancy of a first physical environment, an image-based sensor feature data object describing average lighting of the first particular physical environment, a temperature-based sensor feature data object describing average temperature of a second physical environment, and a pressure-based sensor feature data object describing average occupancy of a third physical environment to determine a predicted maintenance need for an air-conditioning system associated with the three physical environments. As a further example, a cross-sensor predictive inference model may be configured to utilize an image-based sensor feature data object describing average occupancy of a first physical environment, an image-based sensor feature data object describing average lighting of the first particular physical environment, a temperature-based sensor feature data object describing average temperature of a second physical environment, and a pressure-based sensor feature data object describing average occupancy of a third physical environment to determine a predicted quality score for an air-conditioning system model associated with the air-conditioning systems associated with the three physical environments. In some embodiments, the input of a cross-sensor predictive model may include one or more of image data, temperature data, liquid property data (e.g., smell, air quality, chemical composition, shape composition, color spectrum, reflectivity, transparency, etc.), solid property data, gas property composition data, etc.

The term "cross-sensor prediction" may refer to data that describes a prediction generated by a cross-sensor predictive inference model based on processing two or more sensor feature data objects. Examples of cross-sensor predictions include product quality score predictions, product maintenance need predictions, building design score predictions, etc. In some embodiments, a cross-sensor prediction is an ensemble prediction generated by a cross-sensor predictive inference model which is an ensemble model configured to combine predictions of two or more predictive inference models and/or two or more feature extraction models.

The term "target predictive entity" may refer to data that describes particular real-world phenomena that a predictive inference model seeks to predict. Examples of target predictive entities include product quality scores, product maintenance needs, building design scores, etc. In some embodiments, each target predictive entity is associated with a predictive inference model based on one or more properties of the target predictive entity. For example, a target predictive entity that is associated with a numeric score may be associated with a regression predictive inference model. As another example, a target predictive entity that is associated with a quality category (e.g., a quality category selected from the range including a high quality category, a medium quality category, and a low quality category) may be associated with a classification predictive inference model.

The term "prediction-based action" may refer to a computer-implemented routine configured to enable one or more end-user functionalities based on one or more predictions. For example, based on a prediction that indicates maintenance need for an air-conditioning system, a cross-sensor predictive inference computing entity may be configured to schedule maintenance appointments. As another example, based on a prediction that indicates maintenance need for an air-conditioning system, a cross-sensor predictive inference computing entity may be configured to generate digital notifications to an end-user that indicate the noted maintenance need. As yet another example, based on a prediction that indicates maintenance need for an air-conditioning system for a particular room, a cross-sensor predictive inference computing entity may be configured to automatically update calendar invites for the particular room to change location properties of the calendar invites. As a further example, based on a prediction that indicates maintenance need for a server system, a cross-sensor predictive inference computing entity may be configured to automatically perform maintenance (e.g., load balancing maintenance) on the server system.

The term "inferential property" may refer to data that describes a property of a target predictive entity that can be used (e.g., in accordance with a feature definition model) to determine desired observation metrics for sensor input data objects configured to extract sensor feature data objects related to the target predictive entity. For example, an inferential property of a target predictive entity may describe whether the target predictive entity is a numeric score generation task, a category detection task, etc. As another example, an inferential property of a target predictive entity may describe a physical environment and/or a temporal range associated with the target predictive entity.

The term "individual absorption score" may refer to data that describes an estimated or calculated relational awareness tendency of a particular data object given one or more individual attributes of the particular data object. For example, based at least in part on an example model for inferring individual absorption scores, a data object associated with a particular individual person having a high educational degree may be deemed to have a high absorption score. As another example, based at least in part on another example model for generating individual absorption scores, a data object a data object associated with a particular individual person having a particular physical profile (e.g., age, height, weight, and/or the like) may be deemed to have a high absorption score.

The term "hierarchical absorption score" may refer to data that describes an estimated or calculated relational awareness tendency of a particular data object given one or more individual attributes of a parent data object of the particular data object. In some embodiments, the hierarchical absorption score for the data object is determined based at least in part on each individual absorption score for a parent data object that is a hierarchical parent of the data object. In some embodiments, the one or more parent data objects for a particular data object include a hierarchical meta-type of the particular data object, where the hierarchical meta-type of the particular data object indicates whether the particular data object is comprising one or more related hierarchical meta-type designations of a plurality of predefined hierarchical meta-type designations. In some embodiments, the plurality of predefined hierarchical meta-type designations include: a first predefined hierarchical meta-type designation associated with living real-world entities, a second predefined hierarchical meta-type designation associated with non-living-object real-world entities, a third predefined hierarchical meta-type designation associated with location-defining real-world entities, a fourth predefined hierarchical meta-type designation associated with time-defining real-world entities, a fifth predefined hierarchical meta-type designation associated with communication-defining entities, a sixth predefined hierarchical meta-type designation associated with group-defining entities, and a seventh predefined hierarchical meta-type designation associated with knowledge-defining entities.

The term "operational absorption score" may refer to data that describes an estimated or calculated relational awareness tendency of a particular data object given one or more individual attributes of at least one data object that is deemed to be operationally related to (e.g., have a sufficiently strong relationship with) the particular data object. In some embodiments, the operational absorption score for the data object is determined based at least in part on each individual absorption score for a related data object that is operationally related to the particular data object. In some embodiments, a related data object is deemed related to a particular data object if there is a non-hierarchical relationship between the two data objects. In some embodiments, the one or more related data objects for a particular data object of include one or more user-defining objects associated with the particular data object and one or more access-defining data objects associated with the particular data object. In some embodiments, the one or more user-defining objects associated with the particular data object include one or more primary user-defining objects associated with the particular data object and one or more collaborator user-defining objects associated with the particular data object. In some embodiments, the one or more access-defining data objects associated with the particular data object include one or more sharing space data objects associated with the particular data object (e.g., a public sharing space data object, a collaborator space object, a shared space object, and/or the like).

The term "environment state" may refer to data that describes an inferred user purpose and/or an indicated user purpose behind usage of a software environment such as a data interaction platform at a particular time. Environment states may be generated based at least in part on user-supplied information and/or by performing machine learning analysis of the usages of data at different time intervals and/or in different locations. For example, a cross-sensor predictive inference computing entity may infer based at least in part on user interaction data that the user uses separate groups of data objects at different time intervals and thus conclude that the separate groups of data objects belong to different environments. Moreover, selection of one or more environment states for a particular usage session may be performed based at least in part on explicit user selection and/or based at least in part on detecting that the user is at a time-of-day and/or at a location associated with a particular environment state. For example, a cross-sensor predictive inference computing entity may infer a "working" environment state for a particular usage session by a user during working hours and/or while the user is located at a geographic location of the user's office. As further example, a cross-sensor predictive inference computing entity may infer a "working" environment state for a particular usage session by a user during non-working hours due to the actions and information being accessed over a period of time that is related to home or leisure, while not being related to work, though the time period and location would potentially indicate otherwise. However, during the work time-location, though the user may have performed leisure activity and thus have presence in the "leisure" environment, the access to the work environment could be reacted with less than normal additional user action due to the higher existing relational score to work due to the factors associated with location and time. As further discussed below, an innovative aspect of the present invention relates to utilizing relational awareness signals provided by the environment states for usage of a data interaction platform to generate relational awareness scores for particular data objects. In some embodiments, the environment state of a data interaction platform is selected from a plurality of candidate environment states of the data interaction platform. In some of those embodiments, the plurality of candidate environment states of the data interaction platform indicates at least one of the following: one or more private environment states, one or more professional environment states, one or more leisure environment state, and one or more public environment states.

The term "relational awareness score" may refer to data that describes an estimated and/or predicted significance of a relationship associated with a particular data object to modeling real-world and/or virtual relationships of the particular data object which a data model seeks to model. In some embodiments, relational awareness score for a relationship indicates an estimated and/or predicted priority of a relationship associated with a particular data object when performing data retrieval and/or data search of data associated with the particular data object. According to some aspects of the present invention, a data object has relational awareness score with respect to each of its associated data object relationships. This allows the data object to have an independent recognition of various data object relationships, including data object relationships that are typically modeled indirect data object relationships in traditional graph models, while being able to distinguish between more significant data object relationships (e.g., data object relationships having higher respective relational awareness scores) and less significant data object relationships (e.g., data object relationships having lower respective relational awareness scores). In some embodiments, a relational awareness score may be a predictive relational scores, e.g., a relational score between co-workers which may be high while both are employed at the same company, but through evaluation (e.g., using one or more machine learning models) of other relational models of co-workers, their future relational score can be predicted based on alterations in relational scores by other users who were co-workers. For example, two co-workers who also participate in significant activities outside of the work environment would likely have a higher probability of maintaining a higher relational score in the future after one leave the employment of the other, than two co-workers who do not partake in mutual activities outside of the work environment.

III. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

FIG. 1 is a schematic diagram of an example architecture 100 for performing cross-sensor predictive inference. The architecture 100 includes one or more client computing entities 102 and a cross-sensor predictive inference computing entity 106. The cross-sensor predictive inference computing entity 106 may be configured to communicate with at least one of the client computing entities 102 over a communication network (not shown).

The communication network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like). While not depicted in FIG. 1, the cross-sensor predictive inference computing entity 106 may retrieve input data from one or more external computing entities, such as one or more external information server computing entities.

A client computing entity 102 may be configured to provide predictive inference requests to the cross-sensor predictive inference computing entity 106. The cross-sensor predictive inference computing entity 106 may be configured to process the predictive inference requests and provide corresponding outputs to the client computing entity 102. The cross-sensor predictive inference computing entity 106 includes feature extraction engines 112, a cross-sensor predictive inference engines 113, and a prediction-based action engine 114. The functionalities of the noted components of the cross-sensor predictive inference computing entity 106 are described in greater detail below with reference to FIGS. 4-12.

The storage subsystem 108 may be configured to store configuration data associated with various components of the cross-sensor predictive inference computing entity 106, e.g., with the feature extraction engines 112, the cross-sensor predictive inference engines 113, and the prediction-based action engine 114. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Cross-Sensor Predictive Inference Computing Entity

FIG. 2 provides a schematic of a cross-sensor predictive inference computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the cross-sensor predictive inference computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. In some embodiments, the cross-sensor predictive inference computing entity 106 may be configured to perform one or more edge computing capabilities.

As shown in FIG. 2, in one embodiment, the cross-sensor predictive inference computing entity 106 may include or be in communication with one or more processing elements 205 (also referred to as processors, processing circuitry, and/or similar terms used herein interchangeably) that communicate with other elements within the cross-sensor predictive inference computing entity 106 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the cross-sensor predictive inference computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the cross-sensor predictive inference computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the cross-sensor predictive inference computing entity 106 with the assistance of the processing element 205 and operating system.

As indicated, in one embodiment, the cross-sensor predictive inference computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the cross-sensor predictive inference computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the cross-sensor predictive inference computing entity 106 may include or be in communication with one or more input elements, such as a keyboard input, a mouse input, a touch screen/display input, motion input, movement input, audio input, pointing device input, joystick input, keypad input, and/or the like. The cross-sensor predictive inference computing entity 106 may also include or be in communication with one or more output elements (not shown), such as audio output, video output, screen/display output, motion output, movement output, and/or the like.

Exemplary Client Computing Entity

FIG. 3 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing device 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the cross-sensor predictive inference computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the cross-sensor predictive inference computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MIMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing device 308) and/or a user input interface (coupled to a processing device 308). For example, the user interface may be a user application, browser, user interface, and/or similar words used herein interchangeably executing on and/or accessible via the client computing entity 102 to interact with and/or cause display of information/data from the cross-sensor predictive inference computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the cross-sensor predictive inference computing entity 106 and/or various other computing entities.

In another embodiment, the client computing entity 102 may include one or more components or functionality that are the same or similar to those of the cross-sensor predictive inference computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM OPERATIONS

Various embodiments of the present invention address various scalability challenges of sensor-based predictive data analysis models by tuning per-sensor predictive inferences based on sensor-specific feature definition models that integrate relevant information associated with a predictive inference problem to individual per-sensor predictive inference routines. In some embodiments, the noted tuning is performed using per-sensor desired observation metrics defined using per-sensor feature definition models. Utilizing sensor-specific feature definition models to define desired observation metrics for various sensors provides an intuitive and scalable method of integrating cross-sensor considerations while performing per-sensor predictive inferences. In this way, the operational integrity of per-sensor feature extractions is maintained, while cross-sensor signals are integrated as non-intrusive and non-structure-changing output-defining parameters of per-sensor feature extraction models. This innovative feature in turn addresses scalability challenges of sensor-based predictive data analysis systems and makes important contributions to efficiency and effectiveness of sensor-based predictive data analysis systems having a large number of sensors.

Moreover, various embodiments of the present invention address various scalability challenges of sensor-based predictive data analysis systems by generating cross-sensor predictions based on features extracted on a per-sensor level. In this way, the noted embodiments can utilize state-of-the-art sensor-specific feature extraction techniques (e.g., convolutional neural networks for image sensors) while combining, using an intelligent ensemble model, per-sensor predictions in order to generate cross-sensor predictions. The resulting cross-sensor predictions show a strong average accuracy level that results from robustness of underlying sensor-specific model as well as the flexibility and strength of the cross-sensor ensemble models. This innovative feature also addresses scalability challenges of sensor-based predictive data analysis systems and makes important contributions to efficiency and effectiveness of sensor-based predictive data analysis systems having a large number of sensors.

Cross-Sensor Predictive Inference

FIG. 4 is a data flow diagram of an example process 400 for performing cross-sensor predictive inference. Via the various steps/operations depicted in FIG. 4, the cross-sensor predictive inference computing entity 106 can utilize sensor input data objects 401A-D generated by a group of sensors 411 to, in a manner that efficiently and effectively integrates both per-sensor predictive signals and cross-sensor predictive signals, generate reliable cross-sensor predictions 403 and perform prediction-based actions 404 based on the generated cross-sensor predictions 403. Moreover, via the various steps/operations depicted in FIG. 4, the cross-sensor predictive inference computing entity 106 can effectively and efficiently integrate image-based feature extraction models such as convolutional neural networks with non-image-based feature extraction models in a manner that does not undermine structural integrity of the noted image-based feature extraction models.

As depicted in FIG. 4, the process 400 begins when the cross-sensor predictive inference computing entity 106 obtains sensor input data objects 401A-D from sensors 411-A-D. In particular, the feature extraction engines 112 receive the sensor input data objects 401A-D from the sensors 411-A-D. In the example embodiments depicted in FIG. 4, each sensor 411 is configured to generate a single corresponding sensor input data object 401A-D and provide the corresponding sensor input data object 401A-D to a single corresponding feature extraction engine 112 associated with the sensor 411. In particular, sensor A 411A is configured to generate sensor input data object A 401A and provide the sensor input data object A 401A to the feature extraction engine A 112A, sensor B 411B is configured to generate sensor input data object B 401B and provide the sensor input data object B 401B to the feature extraction engine B 112B, sensor C 411C is configured to generate sensor input data object C 401C and provide the sensor input data object C 401C to the feature extraction engine C 112C, and sensor D 411D is configured to generate sensor input data object D 401D and provide the sensor input data object D 401D to the feature extraction engine D 112D. However, a person of ordinary skill in the relevant technology will recognize that any number of sensors may be utilized, any number of feature extraction engines may be utilized, each sensor may generate any number of sensor input data objects, each sensor may be associated with any number of feature extraction engines, and each feature extraction engine may be associated with any number of sensors.

In some embodiments, a sensor input data object is a data object that describes one or more real-world observations by a sensor about a physical environment. Examples of sensor input data objects include image data objects recorded by an image sensor (e.g., a camera), temperature data objects recorded by a thermometer, proximity data objects recorded by a proximity sensor, acceleration data objects record by an accelerometer, pressure data objects recorded by a pressure sensor, position data objects recorded by a position sensor, etc. In some embodiments, a feature extraction engine is configured to apply a feature extraction model to a sensor input data object, where the feature extraction model is an inferential model configured to extract one or more sensor feature data objects from one or more sensor input data objects. Examples of feature extraction models include machine learning models, such as neural network models. In some embodiments, the feature extraction models include image feature extraction models. In some of those embodiments, image feature extraction models include one or more convolutional neural networks, capsule-based machine learning models (e.g., capsule-based convolutional neural networks such as CapsNet), etc. In general, parameters and/or hyper-parameters of a feature extraction model may be determined statically, dynamically, and/or using a training algorithm (e.g., an optimization-based training algorithm, such as gradient descent, gradient descent with backpropagation, gradient descent with backpropagation through time, etc.).

As depicted in FIG. 4, the process 400 continues when the feature extraction engines 112 process the sensor input data objects 401A-D to generate sensor feature data objects 402A-E. In the example embodiments depicted in FIG. 4, each feature extraction engine 112A-C is configured to generate a single corresponding sensor feature data object 402A-C, while the feature extraction engine D 112D is configured to generate two sensor feature data objects D-E 402D-E. In other words, the feature extraction engine A 112A processes the corresponding sensor input data object A 401A received by the feature extraction engine A 112A from the corresponding sensor A 411A to generate the corresponding sensor feature data object A 402A, the feature extraction engine B 112B processes the corresponding sensor input data object B 401B received by the feature extraction engine B 112B from the corresponding sensor B 411B to generate the corresponding sensor feature data object B 402B, the feature extraction engine C 112C processes the corresponding sensor input data object C 401C received by the feature extraction engine C 112C from the corresponding sensor C 411C to generate the corresponding sensor feature data object C 402C, and the feature extraction engine D 112D processes the corresponding sensor input data object D 401D received by the feature extraction engine D 112D from the corresponding sensor D 411D to generate the corresponding sensor feature data objects D-E 402D-E. In general, a person of ordinary skill in the relevant technology will recognize that each feature extraction engine may generate any number of sensor feature data objects.

In some embodiments, a sensor feature data object may be an extracted value of a desired observation metric for a sensor input data object based on the sensor input data object. For example, if a desired observation metric for an image data object is an estimated average occupancy of a corresponding physical environment over a period of time, the sensor feature data object may be a conclusion regarding the estimated average occupancy of the corresponding physical environment over the period of time determined based on processing the noted image data object. As another example, if a desired observation metric for an image data object is an estimated average lighting of a corresponding physical environment over a period of time, the sensor feature data object may be a conclusion regarding the estimated average lighting of the corresponding physical environment over the period of time determined based on processing the noted image data object. As a further example, if a desired observation metric for an image data object is an estimated average usage of a particular object in a corresponding physical environment over a period of time, the sensor feature data object may be a conclusion regarding the estimated average usage of the particular object in the corresponding physical environment over the period of time determined based on processing the noted image data object. In some embodiments, the plurality of feature extraction models comprise a convolutional neural network. In some embodiments, the plurality of feature extraction models comprise a capsule-based machine learning model.

In some embodiments, steps/operations of the example feature extraction engine A 112A may be performed in accordance with the steps/operations depicted in the flowchart diagram of FIG. 5. While various embodiments of the present invention are described with respect to the feature extraction engine A 112A, a person of ordinary skill in the relevant technology will recognized that the described steps/operations can be performed by any feature extraction engine, such as one or more of feature extraction engine B 112B, feature extraction engine C 112C, and feature extraction engine D 112D.

As depicted in FIG. 5, the depicted process begins at step/operation 501 when the feature extraction engine A 112A identifies the sensor input data object A 401A associated with the feature extraction engine A 112A. While various embodiments of the present invention are described with reference to an image data object, a person of ordinary skill in the relevant technology will recognize that any sensor input data object A 401A having any data format may be utilized.

At step/operation 502, the feature extraction engine A 112A retrieves a feature definition model for the sensor input data object A 401A. In some embodiments, a feature definition model is a model that describes what desired observation metrics to extract from a corresponding sensor input data object based on one or more properties of the corresponding sensor data object (e.g., a format of the corresponding sensor data object) and/or one or more inferential properties of a target predictive entity associated with the corresponding sensor data object. In some embodiments, the feature definition model is a static feature definition model. A static feature definition model defines, for a corresponding sensor input data object, a set of desired observation metrics to extract from the corresponding sensor input data object at all times. For example, a static feature definition model for an image data object may instruct that image data object should always be configured to extract occupancy levels for a corresponding physical environment. In some embodiments, the feature definition model is a dynamic feature definition model. A dynamic feature definition model defines, for a corresponding sensor input data object, a set of desired observation metrics to extract from the sensor input data object, where the set of desired observation metrics is determined in part based on guidelines that condition applicability of some desired observation metrics on proper detection and/or particular values of feature data corresponding to other desired observation metrics. For example, a dynamic feature definition model for an image data object may instruct that, if the image data object indicates an acceptable detection of sufficient lighting for a corresponding physical environment, then the image data object should be configured to extract a desired observation metric related to occupancy of the corresponding physical environment. In some embodiments, a feature definition model for a sensor input data object may be defined based at least in part on the sensor associated with the sensor input data object. For example, all image data objects by any image sensor and/or all image data objects associated with one or more designated sensors may be associated with a common feature definition model, e.g., a common dynamic feature definition model.

At step/operation 503, the feature extraction engine A 112A determines one or more desired observation metrics for the sensor input data object A 401A based at least in part on the feature definition model for the sensor input data object A 401A. In some embodiments, a desired observation metric describes a real-world phenomenon whose relevant data is expected to be extractable from a corresponding sensor input data object. For example, a first desired observation metric for an image data object may describe the real-world phenomenon of the average occupancy of a physical environment associated with the image data object over a period of time. As another example, a second observation metric for an image data object may describe the real-world phenomenon of the average lighting of a physical environment associated with the image data object over a period of time. As yet another example, a third observation metric for an image data object may describe the real-world phenomenon of positions of one or more objects in a physical environment associated with the image data object over a period of time. As a further example, a fourth observation metric for an image data object may describe the real-world phenomenon of usages of one or more objects in a physical environment associated with the image data object over a period of time.

In some embodiments, step/operation 503 may be performed in accordance with the steps/operations depicted in the flowchart diagram of FIG. 6. As depicted in FIG. 6, the depicted process begins at step/operation 601 when the feature extraction engine A 112A identifies one or more potential observation metrics for the sensor input data object A 401A. In some embodiments, the feature extraction engine A 112A identifies one or more potential observation metrics for the sensor input data object A 401A based on one or more properties of the sensor A 401A, e.g., based on a type of the sensor A 401A. In some embodiments, the feature extraction engine A 112A identifies one or more potential observation metrics for the sensor input data object A 401A based on one or more properties of the sensor input data object A 401A, e.g., based on a type of the sensor input data object A 401A. For example, the feature extraction engine A 112A may determine that any image data object and/or any sensor input data object associated with an image sensor is associated with one or more of an average capacity potential observation metric, a lighting potential observation metric, an object-position-based potential observation metric, etc.

At step/operation 602, the feature extraction engine A 112A applies the feature definition model determined in step/operation 502 to the potential observation metrics determined in step/operation 601 to select a desired subset of the potential observation metrics. In some embodiments, the feature definition model is defined based at least in part on one or more inferential properties of a target predictive entity. In some of those embodiments, the feature extraction engine A 112A applies the feature definition model to the inferential properties of the target predictive entity to select the desired observation metrics from the potential observation metrics. In some embodiments, the feature definition model is defined based at least in part on a feature confidence measure for each potential observation metric of the one or more potential observation metrics. In some of those embodiments, the feature extraction engine A 112A applies the feature definition model to the feature confidence measures for the potential observation metric metrics to select the desired observation metrics from the potential observation metrics.

In some embodiments, a feature definition model defines one or more metric selection rules each configured to provide guidelines for selecting a desired subset of potential observation metrics, where the one or more metric selection rules may depend on at least one of inferential properties for target predictive entities and metric confidence values. In some embodiments, a target predictive entity describes particular real-world phenomena that a predictive inference model seeks to predict. Examples of target predictive entities include product quality scores, product maintenance needs, building design scores, etc. In some embodiments, each target predictive entity is associated with a predictive inference model based on one or more properties of the target predictive entity. For example, a target predictive entity that is associated with a numeric score may be associated with a regression predictive inference model. As another example, a target predictive entity that is associated with a quality category (e.g., a quality category selected from the range including a high quality category, a medium quality category, and a low quality category) may be associated with a classification predictive inference model. In some embodiments, an inferential property of a target predictive entity describes a property of a target predictive entity that can be used (e.g., in accordance with a feature definition model) to determine desired observation metrics for sensor input data objects configured to extract sensor feature data objects related to the target predictive entity. For example, an inferential property of a target predictive entity may describe whether the target predictive entity is a numeric score generation task, a category detection task, etc. As another example, an inferential property of a target predictive entity may describe a physical environment and/or a temporal range associated with the target predictive entity. In some embodiments, feature confidence measure for a potential observation metric describes a level of confidence in an inferred prediction corresponding to the potential observation metric.

FIG. 7 depicts an operational example of a hierarchical feature definition model 700, which is an example of a dynamic feature definition model described above, that depends on inferential properties of target predictive entities as well as feature confidence measures. According to the example hierarchical feature definition model 700 depicted in FIG. 7, given a target predictive entity having a type TA 701, desired observation metrics include a metric M1 711 and M2 712, as well as a metric M3 713 conditioned on detection of a value for metric M2 712 whose confidence value exceeds a confidence value threshold. Moreover, given a target predictive entity having a type TB 702, desired observation metrics include the metrics M3 713 and M4 714, as well as a metric M2 712 conditioned on detection of a value for metric M4 714 whose confidence value exceeds a confidence value threshold.

Returning to FIG. 6, at step/operation 603, the feature extraction engine A 112A determines the desired observation metrics based on the subset of the potential observation metrics selected in step/operation 602. In some embodiments, the feature extraction engine A 112A adopts the selected subset of the potential observation metrics as the desired observation metrics. In some embodiments, the feature extraction engine A 112A performs one or more dimensionality-reduction operations on the selected subset of the potential observation metrics to generate the desired observation metrics. In some embodiments, the feature extraction engine A 112A processes the selected subset of the potential observation metrics in accordance with a trained metric generation model to generate the desired observation metrics.

Returning to FIG. 5, at step/operation 504, for each desired observation metric of the desired observation metrics determined in step/operation 503, the feature extraction engine A 112A determines the sensor feature data object of the plurality of sensor feature data object by processing the sensor input data object using a feature extraction model that is associated with the sensor input data object A 401A. In some embodiments, the feature extraction model is defined based at least in part on the sensor associated with the sensor input data object A 401A. For example, all image data objects by any image sensor and/or all image data objects associated with one or more designated sensors may be associated with a common feature definition model, e.g., a common dynamic feature definition model. In some embodiments, the feature extraction models comprise one or more image feature extraction models. In some embodiments, the one or more image feature extraction models comprise a convolutional neural network. In some embodiments, the one or more image feature extraction models comprise a capsule-based machine learning model (e.g., CapsNet, see, e.g., Hinton et al., "Dynamic Routing Between Capsules," arXiv:1710.09829v2, published 7 Nov. 2017).

In some embodiments, step/operation 504 may be performed in accordance with the steps/operations depicted in FIG. 8, which is a flowchart diagram of an example process of performing per-sensor feature extraction using qualified model localization. As depicted in FIG. 8, the depicted process begins at step/operation 801 when the feature extraction engine A 112A identifies a generic model and a local model for processing the sensor input data object A 401A to generate the sensor feature data object A 402A. In some embodiments, the local model is a feature extraction model generated based on local training data associated with a physical environment of the sensor data object A 411A. In some embodiments, the generic model is a feature extraction model generated based on global training data not associated with a physical environment of the sensor data object A 411A. In some embodiments, the generic model is a feature extraction model imported using an external library.

At step/operation 802, the feature extraction engine A 112A selects the feature extraction model based on whether a local model confidence measure for the local model exceeds a model confidence threshold value. In some embodiments, responsive to determining that the local model confidence measure for the local model exceeds the model confidence threshold value, the feature extraction engine A 112A adopts the local model as the first feature extraction model. In some embodiments, responsive to determining that the local model confidence measure for the local model fails to exceed the model confidence threshold value, the feature extraction engine A 112A adopts the generic model as the first feature extraction model. In some embodiments, the model confidence threshold value is determined based at least in part on a generic model confidence measure for the generic model. For example, the model confidence threshold value may be equal to the generic model confidence measure for the generic model. As another example, the model confidence threshold value may be generated by applying a weight (e.g., a weight determined using a trained algorithm) to the generic model confidence measure for the generic model. As yet another example, the model confidence threshold value may be determined based on a distribution of estimated a priori reliabilities of individual test predictive labels associated with the test data.

In some embodiments, the local model confidence measure for the local model is generated by using the local model on test data associated with test predictive labels and comparing the inferred labels generated by the local model with the test predictive models. In some embodiments, the local model confidence measure for the local model is generated based on a multi-tiered loss function for the local model that adopts a different confidence measure generation equation for generating the local model confidence measure based on at least one of size of the test data and an estimated a priori reliability of test predictive labels associated with the test data. In some embodiments, the generic model confidence measure for the generic model is generated by using the generic model on test data associated with test predictive labels and comparing the inferred labels generated by the generic model with the test predictive models. In some embodiments, the generic model confidence measure for the local model is generated based on a multi-tiered loss function for the local model that adopts a different confidence measure generation equation for generating the generic model confidence measure based on at least one of size of the test data and an estimated a priori reliability of test predictive labels associated with the test data.

At step/operation 803, the feature extraction engine A 112A determines the sensory feature data object A 402A using the feature extraction model selected in step/operation 802. In some embodiments, by selecting a local model only when the local model confidence measure exceeds the model confidence threshold, the feature extraction engine A 112A enables qualified model localization when selecting per-sensor inference models. Although various embodiments of the present invention describe the noted qualified model localization techniques with respect to per-sensor inference models, a person of ordinary skill in the relevant technology will recognize that the noted qualified model localization techniques can be used to deploy local models of any kind, e.g., deploy local cross-sensor predictive inference models.

In some embodiments, step/operation 504 may be performed in accordance with the steps/operations depicted in FIG. 9, which is an example process of performing per-sensor feature extraction using federated learning. As depicted in FIG. 9, the depicted process begins at step/operation 901 when the feature extraction engine A 112A identifies one or more model generating devices. Examples of model generating devices include client computing devices 102 such as client personal computer devices, client smartphone devices, client tablet devices, client smartwatch devices, etc.

At step/operation 902, the feature extraction engine A 112A receives weight update data for a feature extraction model from each model generating device identified in step/operation 902. In some embodiments, weight update data received from a model generating device includes recommended values for parameters of the feature extraction model, where the recommended values received are determined based on training of the feature extraction model performed on the model generating device. In some embodiments, weight update data received from a model generating device includes recommended values for parameters of the feature extraction model, where the recommended values received are determined based on training of the feature extraction model performed on the model generating device using training data obtained at least in part using one or more sensors of the model generating device. In some embodiments, weight update data received from a model generating device includes recommended values for parameters of the feature extraction model, where the recommended values received are determined based on training of the feature extraction model performed on the model generating device using training data obtained at least in part from one or more data gathering devices that transmitted the training data to the model generation device. Examples of data gathering devices include client computing devices 102 such as client personal computer devices, client smartphone devices, client tablet devices, client smartwatch devices, etc.

At step/operation 903, the feature extraction engine A 112A determines a feature extraction model based at least in part on each weight update data received from a model generating device of the one or more model generating devices. In some embodiments, determining the feature extraction model further comprises determining feature extraction model based at least in part on each training intensity measure for a model generating device of the one or more model generating devices. In some embodiments, the training intensity measure for a model generating device is determined based at least in part on the amount of training data used by the model generating device to generate recommended parameters for a feature extraction model. In some embodiments, the training intensity measure for a model generating device is determined based at least in part on the computational complexity of training performed by the model generating device to generate recommended parameters for a feature extraction model. In some embodiments, the training intensity measure for a model generating device is determined based at least in part on the storage complexity (e.g., RAM storage complexity, hard disk storage complexity, both RAM storage complexity and hard disk storage complexity, etc.) of training performed by the model generating device to generate recommended parameters for a feature extraction model.

At step/operation 904, the feature extraction engine A 112A determines the sensor feature data object A 402A using the feature extraction model determined in step/operation 903. In some embodiments, by determining a feature extraction model based on weight update data received from model generating devices, the feature extraction engine A 112A enables utilizing federated learning in determining sensory feature data. Although various embodiments of the present invention describe the federated learning techniques with respect to per-sensor inference models, a person of ordinary skill in the relevant technology will recognize that the noted federated learning techniques can be used to generate any predictive inference models such as cross-sensor predictive inference models.

In some embodiments, step/operation 504 may be performed in accordance with the steps/operations depicted in FIG. 9, which is an example process of determining image sensor feature data based on image sensor input data. As depicted in FIG. 9, the depicted process includes receiving an image (at step/operation 1001), performing pre-processing on the received image (should this make reference to image being a singular example, though input may include may be of other forms, such as heat, gaseous composition, sound, movement, etc.) (step/operation 1002), performing modeling on the received image (step/operation 1003), and generating an inferential output based on the modeled image (step/operation 1004). Examples of image-based inferential outputs include the image-based object detection output 1100 of FIG. 11 (e.g., including the detected object 1101) and the probabilistic image-based object detection output 1200 of FIG. 12 (e.g., including the probabilistic detected object 1201, which is associated with a detection confidence score of 0.94%).

Returning to FIG. 4, the process 400 continues when the cross-sensor predictive inference engine 113 processes the sensor feature data objects 402A-E using a cross-sensor predictive inference model to generate cross-sensor predictions 403 for a target predictive entity associated with the sensor input data objects 401A-D and/or a target predictive entity associated with the sensors 411A-D. In some embodiments, a cross-sensor predictive inference model is an inferential model configured to process two or more sensor feature data objects in order to generate cross-sensor predictions regarding a target predictive entity associated with the sensor input data objects configured to extract the sensor feature data objects.

For example, a cross-sensor predictive inference model may be configured to utilize an image-based sensor feature data object describing average occupancy of a particular physical environment, an image-based sensor feature data object describing average lighting of the particular physical environment, a temperature-based sensor feature data object describing average temperature of the particular physical environment, and a pressure-based sensor feature data object describing average occupancy of the particular physical environment (e.g., based on estimating pressure extracted on a particular pressure-recording spot in the particular physical environment such as entrance of the particular physical environment) to determine a predicted comfort level for the particular physical environment.

As another example, a cross-sensor predictive inference model may be configured to utilize an image-based sensor feature data object describing average occupancy of a particular physical environment, an image-based sensor feature data object describing average lighting of the particular physical environment, a temperature-based sensor feature data object describing average temperature of the particular physical environment, and a pressure-based sensor feature data object describing average occupancy of the particular physical environment to determine a predicted maintenance need for an air-conditioning system in the particular physical environment.

As yet another example, a cross-sensor predictive inference model may be configured to utilize an image-based sensor feature data object describing average occupancy of a first physical environment, an image-based sensor feature data object describing average lighting of the first particular physical environment, a temperature-based sensor feature data object describing average temperature of a second physical environment, and a pressure-based sensor feature data object describing average occupancy of a third physical environment to determine a predicted maintenance need for an air-conditioning system associated with the three physical environments.

As a further example, a cross-sensor predictive inference model may be configured to utilize an image-based sensor feature data object describing average occupancy of a first physical environment, an image-based sensor feature data object describing average lighting of the first particular physical environment, a temperature-based sensor feature data object describing average temperature of a second physical environment, and a pressure-based sensor feature data object describing average occupancy of a third physical environment to determine a predicted quality score for an air-conditioning system model associated with the air-conditioning systems associated with the three physical environments.

In some embodiments, a cross-sensor prediction 403 is a prediction generated by a cross-sensor predictive inference model based on processing two or more sensor feature data objects. Examples of cross-sensor predictions include product quality score predictions, product maintenance need predictions, building design score predictions, etc. In some embodiments, a cross-sensor prediction is an ensemble prediction generated by a cross-sensor predictive inference model which is an ensemble model configured to combine predictions of two or more predictive inference models and/or two or more feature extraction models.

Returning to FIG. 4, the process 400 continues when the prediction-based action engine 114 performs one or more prediction-based actions 404 based at least in part on the one or more cross-sensor predictions 403. In some embodiments, a prediction-based action is a computer-implemented routine configured to enable one or more end-user functionalities based on one or more predictions.

For example, based on a prediction that indicates maintenance need for an air-conditioning system, a cross-sensor predictive inference computing entity may be configured to schedule maintenance appointments. As another example, based on a prediction that indicates maintenance need for an air-conditioning system, a cross-sensor predictive inference computing entity may be configured to generate digital notifications to an end-user that indicate the noted maintenance need. As yet another example, based on a prediction that indicates maintenance need for an air-conditioning system for a particular room, a cross-sensor predictive inference computing entity may be configured to automatically update calendar invites for the particular room to change location properties of the calendar invites. As a further example, based on a prediction that indicates maintenance need for a server system, a cross-sensor predictive inference computing entity may be configured to automatically perform maintenance (e.g., load balancing maintenance) on the server system.

Prediction Output Data Modeling

In some embodiments, data generated based on any of the outputs of a cross-sensor predictive inference engine may be stored and/or presented in a data interaction platform generated by the cross-sensor predictive inference computing entity 106. FIG. 13 provides an operational example of a user interface 1300 for such a data interaction platform. The user interface 1300 includes user interface elements 1301-1308 as well as user interface element 1310. The user interface elements 1301-1308 each correspond to a hierarchical meta-type designation characterizing root nodes of a hierarchical dependency structure between data objects utilized by the data interaction platform. As further described below, the data interaction platform maintains a hierarchy of data objects, where each child data object hierarchically depends from one or more parent data objects. For example, a data object corresponding to a particular person who is an employee of a particular company and a graduate of a particular university may be a hierarchical dependent of a data object associated with employees of the particular company and a data object associated with graduates of the particular university. The data object associated with the employees of the particular company may in turn be a hierarchical dependent of a data object associated with working adults, while the data object associated with graduates of the particular university may in turn be a hierarchical dependent of a data object associated with university graduates. As further discussed below, an innovative aspect of the present invention relates to utilizing relational awareness signals provided at each level of a hierarchical dependency structure between data objects (e.g., absorption scores of each parent data object for a particular data object) to generate relational awareness scores for particular data objects.

In some embodiments, a cross-the hierarchical dependency structure relates each data object to at least one of various preconfigured hierarchical meta-type designations, where each hierarchical meta-type designation may relate to foundational properties of the data object that give a universal meaning to its relationship with other data objects. As described above, the preconfigured hierarchical meta-type designations may server as root nodes of a hierarchical dependency structure between data objects utilized by the data interaction platform. Various approaches may be adapted to define such preconfigured hierarchical meta-type designations, where each approach may utilize different foundational properties of data objects to define preconfigured hierarchical meta-type designations and/or maintain different levels of granularity for defining preconfigured hierarchical meta-type designations. In the exemplary approach depicted in the user interface 1300 of FIG. 13, the preconfigured hierarchical meta-type designations are defined based on primary and potentially secondary characteristics/classifications to include a "living" designation associated with the user interface element 1301, a "places" designation associated with the user interface element 1302, a "things" designation associated with the user interface element 1303, a "time" designation associated with the user interface element 1304, an "actions" designation associated with the user interface element 1305, a "communications" designation associated with the user interface element 406, a "groupings" designation associated with the user interface element 307, and a "knowledge" designation associated with the user interface element 1308. However, a person of ordinary skill in the relevant technology will recognize that other formulations of the various preconfigured hierarchical meta-type designations are feasible and may confer particular advantages in various implementations and use cases.

Depending on system semantics, the "living" hierarchical meta-type designation may relate to data objects describing people, contacts, animals, plants, and/or the like. An operational example of a user interface depicting visual relationships of particular "living" data objects that may be generated in response to user selection of user interface element 1301 is presented in FIG. 14. The user interface depicted in FIG. 14 includes a visualization of various target "living" data objects, such as the "living" data object corresponding to the individual named "Pooya Shoghi," whose visual representation is depicted using the user interface element 1401 in the user interface of FIG. 14. As depicted in the user interface of FIG. 15, a user selection of the user interface element 1401 depicts data objects that are related to the selected "living" data object, where the data objects are in turn organized by the preconfigured hierarchical meta-type designations discussed above in relation to user interface elements 1301-1308, here associated with the user interface elements 1501-1508 respectively. The user interface depicted in FIG. 15 further enables adding new data objects that are related to the selected "living" data object by selecting a designation for a new data object via the user interface element 1510 and selecting the user interface element 1511, which in turn leads to display of the user interface depicted in FIG. 16, which includes a form for entering attributes of the new data object (such as a company name attribute name that can be entered using user interface element 1601, a company industry sector attribute name that can be entered using user interface element 1602, and company address attributes that can be entered using user interface elements 1603).

Depending on system semantics, the "places" hierarchical meta-type designation may relate to data objects describing locations, cities, regions, countries, continents, and/or the like. A "places" data object may have relationships with data objects of other hierarchical meta-type designations. For example, a "places" data object may have a "was born in" relationship with a "living" data object. As another example, a "places" data object may have a "will be performed in" relationship with an "action" data object. As yet another example, a "places" data object may have a "is located in" relationship with a "things" data object. As a further example, a "places" data object may have "occurred in" relationship with a "communications" data object.

Depending on system semantics, the "things" hierarchical meta-type designation may relate to data objects describing buildings, products, inanimate objects, equipment, inventory, and/or the like. A "things" data object may have relationships with data objects of other hierarchical meta-type designations. For example, a "things" data object may have a "purchased" relationship with a "living" data object. As another example, a "things" data object may have a "is generated using" relationship with an "action" data object. As yet another example, a "things" data object may have a "is located in" relationship with a "places" data object. As a further example, a "things" data object may have "was a subject of" relationship with a "communications" data object. In some embodiments, the "things" data objects may be selected via files of preconfigured formats which are configured to generate visualizations of the noted "things" data objects, for example a file that describe a visualization of a building or a product using relational awareness modeling data associated with the building or the product. FIG. 21 provides an operational example of a file selection user interface that may be generated in response to user selection of user interface element 1303 in order to enable a user to select a file with a preconfigured format that describe a visualization of a "things" data object.

Depending on system semantics, a "time" hierarchical meta-type designation may relate to data objects describing seconds, minutes, hours, dates, and/or the like. A "time" data object may have relationships with data objects of other hierarchical meta-type designations. For example, a "time" data object may have a "was born on" relationship with a "living" data object. As another example, a "time" data object may have a "will be performed on" relationship with an "action" data object. As yet another example, a "time" data object may have a "was purchased on" relationship with a "things" data object. As a further example, a "time" data object may have "occurred on" relationship with a "communications" data object. In some embodiments, a time data object may be a category of particular events. In some embodiments, a time data object may be used in linear and non-linear manners and may be deemed related to an action data object. A time data object may also be used to describe "active" and "inactive" statuses, such as a person being considered "active" during periods that fall within their life span and inactive after their period of death.

Depending on system semantics, an "actions" hierarchical meta-type designation may relate to data objects describing events, tasks, projects, performances, concerts, and/or the like. An "actions" data object may have relationships with data objects of other hierarchical meta-type designations. For example, an "actions" data object may have a "was performed by" relationship with a "living" data object. As another example, an "actions" data object may have a "will be performed on" relationship with a "time" data object. As yet another example, an "actions" data object may have a "can be performed by" relationship with a "things" data object. As a further example, an "actions" data object may have "was processed using" relationship with a "communications" data object. In some embodiments, the "actions" hierarchical meta-type designation may have two child data objects, a "tasks" child data object and a "projects" child data object. FIG. 18 provides an operational example of a user interface that may be generated in response to user interface of user interface element 1305 associated with the "actions" hierarchical meta-type designation. As depicted in FIG. 18, the depicted user interface includes user interface elements 1801-1802, which correspond to the "tasks" data object and "projects" data object respectively. As further depicted in the user interface of FIG. 19, selection of the user interface element 1801 associated with the "tasks" data object relates to depicting various target data objects depending from the "tasks" data object, including the "Install ViZZ" data object associated with the user interface element 1801. As further depicted in the user interface of FIG. 20, selection of user interface element 1801 data objects that are related to the selected "tasks" data object, where the data objects are in turn organized by the preconfigured hierarchical meta-type designations discussed above in relation to user interface elements 1301-1308.

Depending on system semantics, the "communications" hierarchical meta-type designation may relate to data objects describing emails, phone calls, text messages, pager messages, meetings, and/or the like. A "communications" data object may have relationships with data objects of other hierarchical meta-type designations. For example, a "communications" data object may have a "was received by" relationship with a "living" data object. As another example, a "communications" data object may have a "includes guidelines for" relationship with an "action" data object. As yet another example, a "communications" data object may have a "discusses price of" relationship with a "things" data object. As a further example, a "communications" data object may have "occurred in" relationship with a "time" data object.

Depending on system semantics, the "groupings" hierarchical meta-type designation may relate to data objects describing companies, teams, organizations, email lists, and/or the like. A "groupings" data object may have relationships with data objects of other hierarchical meta-type designations. For example, a "groupings" data object may have a "is a participant in" relationship with a "living" data object. As another example, a "groupings" data object may have a "is expected to perform" relationship with an "action" data object. As yet another example, a "groupings" data object may have a "is owner of" relationship with a "things" data object. As a further example, a "groupings" data object may have "was formed in" relationship with a "time" data object. In some embodiments, a groupings data object may signify a relationship between the data objects in each group, for example a collection of people may be represented by a group data object of a company, thereby creating a relationship, via that company, of those contacts.

Depending on system semantics, the "knowledge" hierarchical meta-type designation may relate to data objects describing files, documents, books, articles, and/or the like. A "knowledge" data object may have relationships with data objects of other hierarchical meta-type designations. For example, a "knowledge" data object may have a "is authored by" relationship with a "living" data object. As another example, a "knowledge" data object may have a "describes how to perform" relationship with an "action" data object. As yet another example, a "knowledge" data object may have a "includes information about" relationship with a "things" data object. As a further example, a "knowledge" data object may have "was authored in" relationship with a "time" data object. In some embodiments, the "knowledge" hierarchical meta-type designation may have two child data objects, a "files" child data object and a "documents" child data object. FIG. 20 provides an operational example of a user interface that may be generated in response to user interface of user interface element 408 associated with the "knowledge" hierarchical meta-type designation. As depicted in FIG. 20, the depicted user interface includes user interface elements 2001-2002, which correspond to the "files" data object and the "documents" data object respectively. A knowledge data object may also have "is related to" information within the same characteristic class of knowledge items to other information on the same subject matter Returning to FIG. 13, the user interface 1300 further includes the user interface element 1310 which enables user selection of one or more environment states for the data interaction platform. An environment state of a data interaction platform may indicate an inferred user purpose and/or an indicated user purpose behind usage of the data interaction platform at a particular time. Environment states may be generated based at least in part on user-supplied information and/or by performing machine learning analysis of the usages of data at different time intervals and/or in different locations. For example, the cross-sensor predictive inference computing entity 106 may infer based at least in part on user interaction data that the user uses separate groups of data objects at different time intervals and thus conclude that the separate groups of data objects belong to different environments. Moreover, selection of one or more environment states for a particular usage session may be performed based at least in part on explicit user selection and/or based at least in part on detecting that the user is at a time-of-day and/or at a location associated with a particular environment state. For example, the cross-sensor predictive inference computing entity 106 may infer a "working" environment state for a particular usage session by a user during working hours and/or while the user is located at a geographic location of the user's office. As further discussed below, an innovative aspect of the present invention relates to utilizing relational awareness signals provided by the environment states for usage of a data interaction platform to generate relational awareness scores for particular data objects.

FIG. 22 provides an operational example of a user interface that enables user selection of environment states. As depicted in the user interface of FIG. 22, the defined environment states are divided into four meta-type designations: a "live" designation 2201 (e.g., related to private or personal environment states) that includes the environment state "Pooya's Private Workspace" 2211, a "work" designation 2202 (e.g., related to professional environment states), a "play" designation 2203 (e.g., related to entertainment-related or leisure-related environment states) that includes the environment state "Pooya's Fun" 2213, and a "global" designation 2204 (e.g., related to general or public environment states) that includes the environment state "Global Public" 2214. A user can select an environment state by placing a checkmark next to the user interface element associated with the environment state and selecting the submit button. Selection or deselection of environment states can affect visualizations of retrieved data item. For example, as depicted in the user interface of FIG. 23 relative to the user interface of FIG. 14, after selection of the environment state "Global Public" 2214, selection of the user interface element 1301 leads to generation and display of a more crowded visualization with a greater number of depicted data objects compared to prior to selection of the environment state "Global Public" 2214. In some embodiments, environments can be utilized to define security parameters for accessing particular data objects and/or particular inter-object relationships.

The example data interaction platform depicted and described herein using FIGS. 13-23 can be utilized to process data retrieval queries and generate responsive query outputs, where a data retrieval query is any request to retrieve one or more data objects that correspond to particular data retrieval query criteria, e.g., one or more filtering criteria, one or more search criteria, and/or the like. For example, FIG. 24 provides an operational example of a user interface 2400 for processing data retrieval queries using the noted data interaction platform. As depicted in FIG. 24, the user interface 2400 includes user interface elements 2401 for specifying data retrieval query criteria, user interface elements 2402 for specifying visualization parameters defining a desired visualization of data, and user interface elements 2403 depicting search results. As further depicted in the user interface 2500 of FIG. 25, query outputs can be saved as sessions 2501-2502 and visualization results 2503 may include relationships between retrieved data objects. Processing data retrieval queries using a proposed data interaction platform will be described in greater detail below.

To provide the data modeling, data visualization, external integration, and query processing functionalities discussed herein, a data interaction platform utilizing dynamic relational awareness needs to utilize a robust logical data model that enables both relational awareness modeling aspects as well as dynamic user interaction aspects of the noted functionalities. An example of such a logical data model 2600 for a data interaction system is provided in FIG. 26. As depicted in FIG. 26, a user node 2601 is associated with a user profile object 2602, which uniquely identifies the user node 2601 within the data interaction platform, encodes attributes and relationships of the user node 2601 in relation to the data interaction platform, and enables the user node 2601 to interact with other user nodes 2601 within the data interaction platform. The user profile object 2602 manages various data objects, such as a collaboration space 2603 of user profile objects whose access to the data interaction platform is controlled by the user node 2601, a shared space 2604 of data objects that were shared by the user node 2601 with other user profile objects within the data interaction platform and which may include primary data objects such as primary data object 2641 or other shared spaces such as shared space 2642, a team object 2605 that enables the user node 2601 to manage access to its data on a group level, environment objects 2606 each identifying an environment state associated with the user node 2601, and environment classes 2607 each identifying a meta-type designation of environment states associated with the user node 2601.

As further depicted in the logical data model 2600 of FIG. 26, user profile object 2602 owns a space object 2608 which may act as container of multiple data objects and which may include one or more space objects such as space object 2681, one or more primary data objects such as primary data object 2682, and one or more secondary data objects such as secondary data object 2683. Moreover, user profile object 2602 owns a primary data object 2609 which may act as a primary data node and which may include one or more space objects such as space object 2691, one or more primary data objects such as primary data object 2692, and one or more secondary data objects such as secondary data object 2694. In some embodiments, a secondary data object is a data object that is defined by association with another data object such that it will be deleted upon deletion of the other data object. An example of a secondary data object is a phone number data object for an individual person data object. In some embodiments, at least some of the data objects depicted in the logical data model 2600 of FIG. 26 are "default" data objects, meaning that they are automatically created upon creation of a user profile object. In some embodiments, the default data objects include one or more of the team object 2605, the collaborator space 2603, and the shared space 2604.

In some embodiments, the data interaction platform described with reference to FIGS. 13-26 models data based on relational awareness scores associated with data objects. In some embodiments, to generate a relational awareness score for a data object, the cross-sensor predictive inference computing entity 106 performs the steps/operations of the process 2600 depicted in FIG. 26. As depicted in FIG. 26, the process begins at step/operation 2701 when the cross-sensor predictive inference computing entity 106 generates an individual absorption score for a particular data object. In some embodiments, the individual absorption score of the particular data object indicates an estimated relational awareness tendency of the particular data object given one or more individual attributes of the particular data object. For example, based at least in part on an example model for inferring individual absorption scores, a data object associated with a particular individual person having a high educational degree may be deemed to have a high absorption score. As another example, based at least in part on another example model for generating individual absorption scores, a data object a data object associated with a particular individual person having a particular physical profile (e.g., age, height, weight, and/or the like) may be deemed to have a high absorption score.

At step/operation 2702, the cross-sensor predictive inference computing entity 106 generates a hierarchical absorption score for the particular data object. For example, the hierarchical absorption score for a particular data object that has a hierarchical parents P1, P2, and P3 may be determined based at least in part on individual absorption scores of P1, P2, and P3. In some embodiments, the hierarchical absorption score for the data object is determined based at least in part on each individual absorption score for a parent data object that is a hierarchical parent of the data object. In some embodiments, the one or more parent data objects for a particular data object include a hierarchical meta-type of the particular data object, where the hierarchical meta-type of the particular data object indicates whether the particular data object is comprising one or more related hierarchical meta-type designations of a plurality of predefined hierarchical meta-type designations.

In some embodiments, the plurality of predefined hierarchical meta-type designations include: a first predefined hierarchical meta-type designation associated with living real-world entities, a second predefined hierarchical meta-type designation associated with non-living-object real-world entities, a third predefined hierarchical meta-type designation associated with location-defining real-world entities, a fourth predefined hierarchical meta-type designation associated with time-defining real-world entities, a fifth predefined hierarchical meta-type designation associated with communication-defining entities, a sixth predefined hierarchical meta-type designation associated with group-defining entities, and a seventh predefined hierarchical meta-type designation associated with knowledge-defining entities.

At step/operation 2703, the cross-sensor predictive inference computing entity 106 generates an operational absorption score for the particular data object. In some embodiments, the operational absorption score for the data object is determined based at least in part on each individual absorption score for a related data object that is operationally related to the particular data object. In some embodiments, a related data object is deemed related to a particular data object if there is a non-hierarchical relationship between the two data objects. In some embodiments, the one or more related data objects for a particular data object of include one or more user-defining objects associated with the particular data object and one or more access-defining data objects associated with the particular data object. In some embodiments, the one or more user-defining objects associated with the particular data object include one or more primary user-defining objects associated with the particular data object and one or more collaborator user-defining objects associated with the particular data object. In some embodiments, the one or more access-defining data objects associated with the particular data object include one or more sharing space data objects associated with the particular data object (e.g., a public sharing space data object, a collaborator space object, a shared space object, and/or the like).

At step/operation 2704, the cross-sensor predictive inference computing entity 106 generates an attribute-based absorption score for the particular data object. In some embodiments, the attribute-based absorption score for the particular data object is performed based at least in part on each individual absorption score for a similar data object whose respective individual attributes are determined to be sufficiently similar to the one or more object attributes of the particular data object. In some embodiments, the cross-sensor predictive inference computing entity 106 generates a distance measure between each pair of data objects and determines particular pairs of data objects whose distance measure exceeds a threshold distance measure. In some of those embodiments, the cross-sensor predictive inference computing entity 106 generates an attribute-based absorption score for a particular data object based at least in part on any data object that is member of a particular pair of data objects that also includes the particular data object.

At step/operation 2705, the cross-sensor predictive inference computing entity 106 generates the relational awareness score for the particular data object based at least in part on the individual absorption score for the particular data object, the hierarchical absorption score for the particular data object, the operational absorption score for the particular data object, and the attribute absorption score for the particular data object. In some embodiments, to generate the relational awareness score for the particular data object, the cross-sensor predictive inference computing entity 106 applies a parameter to each of the individual absorption score for the particular data object, the hierarchical absorption score for the particular data object, the operational absorption score for the particular data object, and the attribute absorption score for the particular data object, where each parameter may be determined using a preconfigured absorption score generation model such as a generalized linear model and/or using a supervised machine learning algorithm for determining absorption scores.

VI. CONCLUSION

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous. Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for cross-sensor predictive inference, the computer-implemented method comprising:
identifying a plurality of sensor input data objects comprising one or more image data objects;
determining a plurality of sensor feature data objects based at least in part on the plurality of sensor input data objects, wherein determining the plurality of sensor feature data objects comprises:
for each sensor input data object of the plurality of sensor input data objects, determining one or more desired observation metrics based at least in part on a feature definition model for the sensor input data object; and
for each desired observation metric of the one or more desired observation metrics that is associated with a sensor input data object of the plurality of sensor input data objects, determining a sensor feature data object of the plurality of sensor feature data object by processing the sensor input data object using a feature extraction model of a plurality of feature extraction models that is associated with the sensor input data object, wherein the plurality of feature extraction models comprises one or more image feature extraction models;
generating one or more cross-sensor predictions for a target predictive entity associated with the plurality of sensor input data objects by processing the plurality of sensor feature data objects using a cross-sensor predictive inference model; and
performing one or more prediction-based actions based at least in part on the one or more cross-sensor predictions.

2. The computer-implemented method of claim 1, wherein the plurality of feature extraction models comprises a convolutional neural network.

3. The computer-implemented method of claim 1, wherein the plurality of feature extraction models comprises a capsule-based machine learning model.

4. The computer-implemented method of claim 1, wherein determining the one or more desired observation metrics for a sensor input data object of the plurality of sensor input data objects comprises:
identifying one or more potential observation metrics for the sensor input data object; and
determining the one or more desired observation metrics by selecting a desired subset of the one or more potential observation metrics based at least in part on the feature definition model for the sensor.

5. The computer-implemented method of claim 1, wherein the feature definition model is defined based at least in part on one or more inferential properties of the target predictive entity.

6. The computer-implemented method of claim 1, wherein the feature definition model is defined based at least in part on a feature confidence measure for each potential observation metric of the one or more potential observation metrics.

7. The computer-implemented method of claim 1, wherein generating a first feature extraction model of the plurality of feature models that is associated with a first sensor data object of the plurality of sensor data objects comprises:
identifying a generic model and a local model, wherein the local model is generated based at least in part on local training data associated with a physical environment of the first sensor data object;
determining whether a local model confidence measure for the local model exceeds a model confidence threshold value;
responsive to determining that the local model confidence measure for the local model exceeds the model confidence threshold value, adopting the local model as the first feature extraction model; and
responsive to determining that the local model confidence measure for the local model fails to exceed the model confidence threshold value, adopting the generic model as the first feature extraction model.

8. The computer-implemented method of claim 7, wherein the model confidence threshold value is determined based at least in part on a generic model confidence measure for the generic model.

9. The computer-implemented method of claim 1, wherein generating a first feature extraction model of the plurality of feature models comprises:
identifying one or more model generating devices associated with the first feature extraction model;
receiving, from each model generating device of the one or more model generating devices, weight update data for the first feature extraction model; and
determining the first feature extraction model based at least in part on each weight update data received from a model generating device of the one or more model generating devices.

10. The computer-implemented method of claim 9, wherein determining the first feature extraction model further comprises determining first feature extraction model based at least in part on each training intensity measure for a model generating device of the one or more model generating devices.

11. The computer-implemented method of claim 1, wherein:
each sensor input data object of the plurality of sensor input data objects is associated with a sensor of a plurality sensors, and
each feature definition model for a sensor input data object of the plurality of sensor input data objects is determined based at least in part on the sensor of the plurality sensors that is associated with the sensor input data object.

12. An apparatus for cross-sensor predictive inference, the apparatus comprising at least one processor and at least one memory including program code, the at least one memory and the program code configured to, with the processor, cause the apparatus to at least:
identify a plurality of sensor input data objects comprising one or more image data objects;
determine a plurality of sensor feature data objects based at least in part on the plurality of sensor input data objects, wherein determining the plurality of sensor feature data objects comprises:
for each sensor input data object of the plurality of sensor input data objects, determining one or more desired observation metrics based at least in part on a feature definition model for the sensor input data object; and
for each desired observation metric of the one or more desired observation metrics that is associated with a sensor input data object of the plurality of sensor input data objects, determining a sensor feature data object of the plurality of sensor feature data object by processing the sensor input data object using a feature extraction model of a plurality of feature extraction models that is associated with the sensor input data object, wherein the plurality of feature extraction models comprise one or more image feature extraction models;

generate one or more cross-sensor predictions for a target predictive entity associated with the plurality of sensor input data objects by processing the plurality of sensor feature data objects using a cross-sensor predictive inference model; and perform one or more prediction-based actions based at least in part on the one or more cross-sensor predictions.

13. The apparatus of claim 12, wherein determining the one or more desired observation metrics for a sensor input data object of the plurality of sensor input data objects comprises:

identifying one or more potential observation metrics for the sensor input data object; and determining the one or more desired observation metrics by selecting a desired subset of the one or more potential observation metrics based at least in part on the feature definition model for the sensor.

14. The apparatus of claim 12, wherein generating a first feature extraction model of the plurality of feature models that is associated with a first sensor data object of the plurality of sensor data objects comprises:

identifying a generic model and a local model, wherein the local model is generated based at least in part on local training data associated with a physical environment of the first sensor data object;

determining whether a local model confidence measure for the local model exceeds a model confidence threshold value;

responsive to determining that the local model confidence measure for the local model exceeds the model confidence threshold value, adopting the local model as the first feature extraction model; and responsive to determining that the local model confidence measure for the local model fails to exceed the model confidence threshold value, adopting the generic model as the first feature extraction model.

15. The apparatus of claim 12, wherein generating a first feature extraction model of the plurality of feature models comprises:

identifying one or more model generating devices associated with the first feature extraction model;

receiving, from each model generating device of the one or more model generating devices, weight update data for the first feature extraction model; and determining the first feature extraction model based at least in part on each weight update data received from a model generating device of the one or more model generating devices.

16. The apparatus of claim 12, wherein:

each sensor input data object of the plurality of sensor input data objects is associated with a sensor of a plurality sensors, and each feature definition model for a sensor input data object of the plurality of sensor input data objects is determined based at least in part on the sensor of the plurality sensors that is associated with the sensor input data object.

17. A computer program product for cross-sensor predictive inference, the computer program product comprising at least one non-transitory computer-readable storage medium having computer-readable program code portions stored therein, the computer-readable program code portions configured to:

identify a plurality of sensor input data objects comprising one or more image data objects;

determine a plurality of sensor feature data objects based at least in part on the plurality of sensor input data objects, wherein determining the plurality of sensor feature data objects comprises:

for each sensor input data object of the plurality of sensor input data objects, determining one or more desired observation metrics based at least in part on a feature definition model for the sensor input data object; and for each desired observation metric of the one or more desired observation metrics that is associated with a sensor input data object of the plurality of sensor input data objects, determining a sensor feature data object of the plurality of sensor feature data object by processing the sensor input data object using a feature extraction model of a plurality of feature extraction models that is associated with the sensor input data object, wherein the plurality of feature extraction models comprises one or more image feature extraction models;

generate one or more cross-sensor predictions for a target predictive entity associated with the plurality of sensor input data objects by processing the plurality of sensor feature data objects using a cross-sensor predictive inference model; and perform one or more prediction-based actions based at least in part on the one or more cross-sensor predictions.

18. The computer program product of claim 17, wherein determining the one or more desired observation metrics for a sensor input data object of the plurality of sensor input data objects comprises:

identifying one or more potential observation metrics for the sensor input data object; and determining the one or more desired observation metrics by selecting a desired subset of the one or more potential observation metrics based at least in part on the feature definition model for the sensor.

19. The computer program product of claim 17, wherein generating a first feature extraction model of the plurality of feature models that is associated with a first sensor data object of the plurality of sensor data objects comprises:

identifying a generic model and a local model, wherein the local model is generated based at least in part on local training data associated with a physical environment of the first sensor data object;

determining whether a local model confidence measure for the local model exceeds a model confidence threshold value;

responsive to determining that the local model confidence measure for the local model exceeds the model confidence threshold value, adopting the local model as the first feature extraction model; and responsive to determining that the local model confidence measure for the local model fails to exceed the model confidence threshold value, adopting the generic model as the first feature extraction model.

20. The computer program product of claim 17, wherein generating a first feature extraction model of the plurality of feature models comprises:

identifying one or more model generating devices associated with the first feature extraction model;

receiving, from each model generating device of the one or more model generating devices, weight update data for the first feature extraction model; and determining the first feature extraction model based at least in part on each weight update data received from a model generating device of the one or more model generating devices.

\* \* \* \* \*

UNITED STATES PATENT AND TRADEMARK OFFICE
CERTIFICATE OF CORRECTION

PATENT NO. : 11,402,811 B2
APPLICATION NO. : 16/699838
DATED : August 2, 2022
INVENTOR(S) : Hughes et al.

It is certified that error appears in the above-identified patent and that said Letters Patent is hereby corrected as shown below:

In the Claims

Column 39
Line 4, "comprise" should read --comprises--

Signed and Sealed this
Nineteenth Day of September, 2023

Katherine Kelly Vidal
*Director of the United States Patent and Trademark Office*